US010476626B2

(12) United States Patent
Liu et al.

(10) Patent No.: US 10,476,626 B2
(45) Date of Patent: Nov. 12, 2019

(54) RESOURCE CONFIGURATION METHOD, USER EQUIPMENT, AND BASE STATION

(71) Applicant: Huawei Technologies Co., Ltd., Shenzhen, Guangdong (CN)

(72) Inventors: Jianqin Liu, Beijing (CN); Qiang Wu, Beijing (CN); Yongxing Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 135 days.

(21) Appl. No.: 15/607,232

(22) Filed: May 26, 2017

(65) Prior Publication Data
US 2017/0264390 A1 Sep. 14, 2017

Related U.S. Application Data

(63) Continuation of application No. PCT/CN2014/092587, filed on Nov. 28, 2014.

(51) Int. Cl.
*H04L 1/00* (2006.01)
*H04W 16/28* (2009.01)
(Continued)

(52) U.S. Cl.
CPC ............ *H04L 1/0001* (2013.01); *H04W 16/28* (2013.01); *H04W 24/10* (2013.01); *H04B 7/0632* (2013.01);
(Continued)

(58) Field of Classification Search
CPC ....... H04L 1/00; H04L 1/0001; H04L 1/0026; H04L 1/20; H04L 1/0003; H04W 24/10;
(Continued)

(56) References Cited

U.S. PATENT DOCUMENTS

2015/0098346 A1* 4/2015 Guo ..................... H04B 7/0478
370/252
2015/0222340 A1* 8/2015 Nagata .................. H04W 16/28
375/267
(Continued)

FOREIGN PATENT DOCUMENTS

CN 102394678 A 3/2012
CN 102801498 A 11/2012
(Continued)

OTHER PUBLICATIONS

LG Electronics, "Discussion on RS design enhancements", 3GPP TSG RAN WG1 Meeting 379, R1-144912, Nov. 2014, 8 pages.
(Continued)

*Primary Examiner* — Kyaw Z Soe
(74) *Attorney, Agent, or Firm* — Slater Matsil, LLP

(57) ABSTRACT

According to a resource configuration method, user equipment, and a base station that are provided in embodiments of the present invention and relate to the communications field, reference signals used for measurement and overheads of corresponding measurement and feedback are reduced. A specific solution is as follows: A base station sends M reference signals to UE in N time units in a time unit set, where the reference signal is used by the UE to perform channel quality measurement, and each reference signal in the M reference signals is corresponding to one piece of precoding matrix information; receives channel quality indication information sent by the UE.

20 Claims, 7 Drawing Sheets

A base station configures M channel quality measurement processes for UE in N time units in a time unit set — 301

(51) Int. Cl.
*H04W 24/10* (2009.01)
*H04B 7/06* (2006.01)
*H04L 1/20* (2006.01)
*H04W 72/08* (2009.01)

(52) U.S. Cl.
CPC .......... *H04L 1/0003* (2013.01); *H04L 1/0026* (2013.01); *H04L 1/20* (2013.01); *H04W 72/085* (2013.01)

(58) Field of Classification Search
CPC ... H04W 16/28; H04W 72/085; H04B 7/0632
See application file for complete search history.

(56) References Cited

U.S. PATENT DOCUMENTS

| | | | |
|---|---|---|---|
| 2016/0021551 A1 | 1/2016 | Park et al. | |
| 2016/0191273 A1 | 6/2016 | Nagata et al. | |
| 2016/0373180 A1 | 12/2016 | Guo et al. | |
| 2017/0317853 A1 | 11/2017 | Seo et al. | |

FOREIGN PATENT DOCUMENTS

| | | |
|---|---|---|
| CN | 103546208 A | 1/2014 |
| CN | 103597753 A | 2/2014 |
| CN | 103716081 A | 4/2014 |
| JP | 2014053811 A | 3/2014 |
| WO | 2014/038321 A1 | 3/2014 |
| WO | 2014052806 A1 | 4/2014 |
| WO | 2014116928 A1 | 7/2014 |
| WO | 2014157824 A1 | 10/2014 |

OTHER PUBLICATIONS

"3rd Generation Partnership Project; Technical Specification Group Radio Access Network; Evolved Universal Terrestrial Radio Access (E-UTRA); Physical layer procedures (Release 12)", 3GPP TS 36.213 V12.3.0, Sep. 2014, 212 pages.

\* cited by examiner

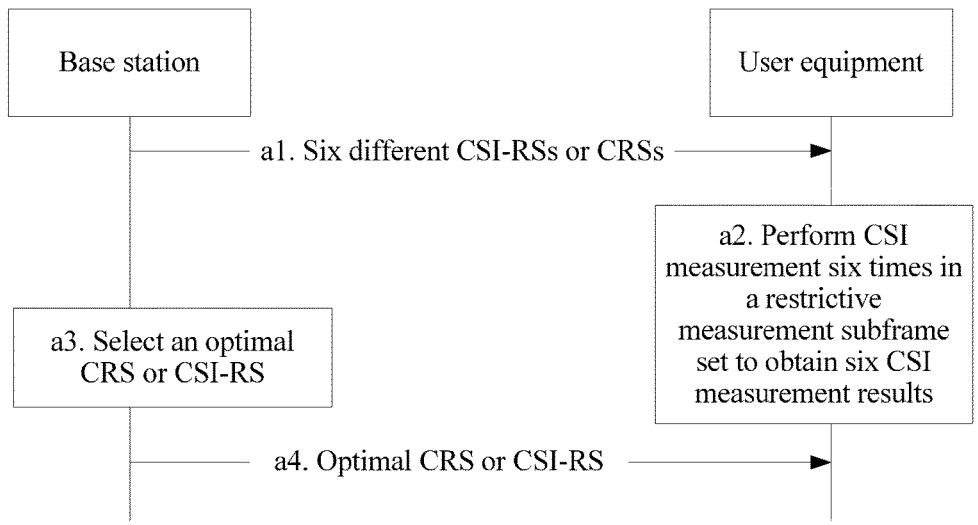

FIG. 3

| A base station configures M channel quality measurement processes for UE in N time units in a time unit set | — 301 |

FIG. 4

| A base station configures M channel quality measurement processes for UE in N time units in a time unit set | — 301 |

| The base station selects an optimal type of channel quality measurement process according to channel quality measurement results corresponding to L types of channel quality measurement processes | — 302 |

| The base station sends a reference signal resource to the UE according to reference signal resource configuration information corresponding to the type of channel quality measurement process | — 303 |

FIG. 5

RESOURCE CONFIGURATION METHOD, USER EQUIPMENT, AND BASE STATION

CROSS-REFERENCE TO RELATED APPLICATION(S) AND CLAIM OF PRIORITY

This application is a continuation of International Application No. PCT/CN2014/092587, filed on Nov. 28, 2014, the disclosure of which is hereby incorporated by reference in its entirety.

TECHNICAL FIELD

The present invention relates to the communications field, and in particular, to a resource configuration method, user equipment, and a base station.

BACKGROUND

As a quantity of wireless users and wireless data traffic sharply increase, a user imposes a higher requirement for a capacity and seamless coverage of a wireless network. To satisfy the user's requirement, an antenna form of an active antenna system (Active Antenna Systems, AAS for short) is widely applied to a communications industry.

Antenna elements in each column in the AAS can be connected to multiple power amplifiers. Therefore, multiple antenna ports can be separately formed in a horizontal dimension and in a vertical dimension. In addition, to ensure that a base station can flexibly provide better signal coverage for a user in a vertical direction, a drive network (a main function of the drive network is to map a vertical-direction antenna element onto an antenna port, so as to provide services for users in different scenarios by using different antenna ports) in which a downtilt and a beam shape can be flexibly adjusted in an automatic manner in a vertical direction is provided in the prior art. A structure of the drive network is:

$$Q = \begin{pmatrix} A_1 & 0 & & 0 & A_k & 0 & & 0 & A_1 & & A_k \\ 0 & A_1 & \cdots & 0 & \cdots & 0 & A_k & \cdots & 0 & \alpha_1 A_1 & \cdots & \alpha_1 A_1 \\ \vdots & \vdots & & \vdots & & \vdots & \vdots & & \vdots & \vdots & & \vdots \\ 0 & 0 & & A_1 & & 0 & 0 & & A_k & \alpha_{p-1} A_1 & & \alpha_{p-1} A_k \end{pmatrix},$$

where Q is
a matrix including p×k block matrixes, p is a quantity of vertical-direction antenna ports in a column, and k indicates a quantity of optional drive network weighted candidates. $A_i$ is a block matrix in the matrix Q and indicates that the block matrix is a weighting vector used to map z (z>=1) antenna elements onto one antenna port, and $\alpha_i$ is a complex value weighting coefficient on the second antenna port. In this way, adaptive reference signals may be configured for the users in the different scenarios by selecting different columns in the drive network Q.

For example, a 3 Dimension Urban Micro (3 Dimension Urban Micro, 3DUMi for short) scenario in the 3rd Generation Partnership Project (3rd Generation Partnership Project, 3GPP for short) is used as an example. In the scenario, if a base station has a height of 10 meters, a building has eight floors, and each floor is three meters high, to ensure that all users in the whole building can be provided with good enough signal coverage, the base station may allocate a downtilt beam of 12 degrees to users in the first to the fourth floors whose heights are lower than that of the base station, and allocate a downtilt beam of −6 degrees (a downtilt beam projected upward from the base station) to users in the fifth to the eighth floors whose heights are higher than that of the base station: Therefore a drive network in the scenario may be designed as:

$$Q' = \begin{pmatrix} A_1 & 0 & A_2 & 0 & A_1 & A_2 \\ 0 & A_1 & 0 & A_2 & \alpha_1 A_1 & \alpha_2 A_2 \end{pmatrix},$$

where $A_1$ is a downtilt beam vector pointing to 12 degrees, and $A_2$ is a downtilt beam vector pointing to −6 degrees. The drive network Q' includes six different beams (each beam is corresponding to one direction and one width). Based on the six different beams in the drive network Q', the base station may allocate, to users in different scenarios, reference signals corresponding to reference signals based on the different beams.

However, the inventor finds that when configuring a reference signal for user equipment (User Equipment, UE for short), a base station needs to send measurement reference signals corresponding to all possible configuration combinations in a drive network to the UE, to enable the UE to feed back corresponding channel quality information, so that the base station selects, from the possible combinations according to the channel quality information that is fed back, an optimal drive network configuration (that is, an optimal reference signal) and a measurement reference signal corresponding to the configuration. Specifically, Q' is used as an example. A maximum of six antenna ports may be formed in Q'. When two antenna ports need to be formed, the two antenna ports are formed in a maximum of $C_6^2=15$ possible drive network configuration combinations, and each configuration combination is corresponding to one to-be-sent and to-be-measured reference signal. Therefore, when there are plenty of combination solutions, reference signals and overheads of corresponding measurement and feedback are increased.

SUMMARY

Embodiments of the present invention provide a resource configuration method, user equipment, and a base station, and can reduce reference signals used for measurement and overheads of corresponding measurement and feedback.

To achieve the foregoing objective, the following technical solutions are used in the embodiments of the present invention:

According to a first aspect, a resource configuration method is provided, including:

sending, by a base station, M reference signals to user equipment UE in N time units in a time unit set, where the reference signal is used by the UE to perform channel quality measurement, and each reference signal in the M reference signals is corresponding to one piece of precoding matrix information;

receiving channel quality indication information sent by the UE, where the channel quality indication information is determined by the UE according to the M reference signals;

selecting an optimal reference signal resource for the UE according to the channel quality indication information; and sending an optimal reference signal to the UE according to the optimal reference signal resource.

In a first possible implementation manner of the first aspect, before the sending, by a base station, M reference signals to user equipment UE in N time units in a time unit set, the method further includes:

sending, by the base station, resource configuration information of the M reference signals to the UE in the N time units in the time unit set, where the resource configuration information of the reference signals includes at least one piece of port information of the reference signals, number information of the reference signals, or precoding information corresponding to the reference signals.

In a second possible implementation manner of the first aspect, the channel quality indication information includes M channel quality measurement results, an optimal channel quality measurement result, or a reference signal number.

In a third possible implementation manner of the first aspect, the time unit set is notified by the base station to the UE by using higher layer signaling or a control channel.

In a fourth possible implementation manner of the first aspect, the reference signal includes a cell-specific reference signal or a user-specific reference signal.

With reference to the first possible implementation manner of the first aspect, in a fifth possible implementation manner of the first aspect, when the reference signal is a cell-specific reference signal, the base station indicates the resource configuration information of the reference signals by using a broadcast channel.

With reference to any one of the first aspect or the first to the fifth possible implementation manner of the first aspect, in a sixth possible implementation manner of the first aspect, the time unit set is periodically or non-periodically notified by the base station to the UE.

In a seventh possible implementation manner of the first aspect, the sending an optimal reference signal to the UE according to the optimal reference signal resource specifically includes:

sending, by the base station, the optimal reference signal to the UE according to the optimal reference signal resource in each time unit that is after the time unit set and before a next time unit set is configured.

According to a second aspect, a channel quality measurement method is provided, including:

receiving, by user equipment UE, M reference signals sent by a base station in N time units in a time unit set, where each reference signal in the M reference signals is corresponding to one piece of precoding matrix information;

reporting channel quality indication information to the base station based on the M reference signals, so that the base station selects an optimal reference signal resource for the UE according to the channel quality indication information; and receiving an optimal reference signal sent by the base station according to the optimal reference signal resource.

In a first possible implementation manner of the second aspect, before the receiving, by user equipment UE, M reference signals sent by a base station in N time units in a time unit set, the method further includes:

receiving, by the UE, resource configuration information of the M reference signals that is sent by the base station in the N time units in the time unit set, where the resource configuration information of the reference signals includes at least one piece of port information of the reference signals, number information of the reference signals, or precoding information corresponding to the reference signals.

In a second possible implementation manner of the second aspect, the channel quality indication information includes M channel quality measurement results, an optimal channel quality measurement result, or a reference signal number.

In a third possible implementation manner of the second aspect, the time unit set is notified by the base station to the UE by using higher layer signaling or a control channel.

In a fourth possible implementation manner of the second aspect, the reference signal includes a cell-specific reference signal or a user-specific reference signal.

With reference to the first possible implementation manner of the second aspect, in a fifth possible implementation manner of the second aspect, when the reference signal is a cell-specific reference signal, the method further includes:

detecting, by the UE, a broadcast channel to obtain the resource configuration information of the reference signals.

With reference to any one of the second aspect or the first to the fifth possible implementation manners of the second aspect, in a sixth possible implementation manner of the second aspect, the time unit set is periodically or non-periodically notified by the base station to the UE.

In a seventh possible implementation manner of the second aspect, the receiving, by the UE, an optimal reference signal sent by the base station according to the optimal reference signal resource specifically includes:

receiving, by the UE in each time unit that is after the time unit set and before a next time unit set is configured, the optimal reference signal sent by the base station according to the optimal reference signal resource.

According to a third aspect, a resource configuration method is provided, including:

configuring, by a base station, M channel quality measurement processes for a user terminal UE in N time units in a time unit set, where each channel quality measurement process is corresponding to one piece of reference signal configuration information, the reference signal configuration information is used by the UE to perform channel quality measurement based on a configured reference signal, the M channel quality measurement processes include L types of channel quality measurement processes, each type of channel quality measurement process includes a maximum of N channel quality measurement processes, and $L<=M<=L*N$.

In a first possible implementation manner of the third aspect, each channel quality measurement process in the L types of channel quality measurement processes is corresponding to one piece of precoding matrix information, and precoding matrix information corresponding to the any two types of channel quality measurement processes is different.

With reference to the third aspect or the first possible implementation manner of the third aspect, in a second possible implementation manner of the third aspect, each type of channel quality measurement process in the L types of channel quality measurement processes is corresponding to one channel quality measurement result, and the channel quality measurement result corresponding to each type of channel quality measurement process is obtained by the UE or the base station based on channel quality measurement results in all channel quality measurement processes that belong to the type and that are in the M channel quality measurement processes.

With reference to the second possible implementation manner of the third aspect, in a third possible implementation manner of the third aspect, after the configuring, by a base station, M channel quality measurement processes for a user terminal UE in N time units in a time unit set, the method further includes:

selecting, by the base station, an optimal type of channel quality measurement process according to channel quality measurement results corresponding to the L types of channel quality measurement processes; and sending, by the base station, a reference signal to the UE according to reference signal configuration information corresponding to the type of channel quality measurement process.

With reference to the second possible implementation manner or the third possible implementation manner of the third aspect, in a fourth possible implementation manner of the third aspect, the channel quality measurement result includes at least one of a channel quality indicator CQI, a precoding matrix indicator PMI, a rank indicator RI, reference signal received power RSRP, reference signal received quality RSRQ, or a reference signal strength indicator RSSI.

In a fifth possible implementation manner of the third aspect, each channel quality measurement process in the M channel quality measurement processes includes an identification field, the identification field includes channel quality measurement process identification information that is used to indicate a type to which the channel quality measurement process belongs, and identification information in channel quality measurement processes of a same type is the same.

In a sixth possible implementation manner of the third aspect, the time unit set is notified by the base station to the UE by using higher layer signaling or a control channel.

With reference to any one of the third aspect or the first to the sixth possible implementation manners of the third aspect, in a seventh possible implementation manner of the third aspect, the time unit set is periodically or non-periodically notified by the base station to the UE.

According to a fourth aspect, a channel quality measurement method is provided, including:

receiving, by user equipment UE in N time units in a time unit set, M channel quality measurement processes configured by a base station, where each channel quality measurement process is corresponding to one piece of reference signal configuration information, the M channel quality measurement processes include L types of channel quality measurement processes, each type of channel quality measurement process includes a maximum of N channel quality measurement processes, and L<=M<=L*N; and performing, by the UE, channel quality measurement based on the M configured channel quality measurement processes and a reference signal corresponding to each channel quality measurement process.

In a first possible implementation manner of the fourth aspect, each channel quality measurement process in the L types of channel quality measurement processes is corresponding to one piece of precoding matrix information, and precoding matrix information corresponding to the any two types of channel quality measurement processes is different.

With reference to the fourth aspect or the first possible implementation manner of the fourth aspect, in a second possible implementation manner of the fourth aspect, each type of channel quality measurement process in the L types of channel quality measurement processes is corresponding to one channel quality measurement result, and the channel quality measurement result corresponding to each type of channel quality measurement process is obtained by the UE or the base station based on channel quality measurement results in all channel quality measurement processes that belong to the type and that are in the M channel quality measurement processes.

With reference to the second possible implementation manner of the fourth aspect, in a third possible implementation manner of the fourth aspect, after the performing, by the UE, channel quality measurement based on the M configured channel quality measurement processes and a reference signal corresponding to each channel quality measurement process, the method further includes:

reporting, by the UE, channel quality measurement results corresponding to the L types of channel quality measurement processes to the base station, so that the base station selects an optimal type of channel quality measurement process according to the channel quality measurement results corresponding to the L types of channel quality measurement processes; and receiving, by the UE, a reference signal sent by the base station according to reference signal configuration information corresponding to the selected optimal type of channel quality measurement process.

With reference to the second possible implementation manner or the third possible implementation manner of the fourth aspect, in a fourth possible implementation manner of the fourth aspect, the channel quality measurement result includes at least one of a channel quality indicator CQI, a precoding matrix indicator PMI, a rank indicator RI, reference signal received power RSRP, reference signal received quality RSRQ, or a reference signal strength indicator RSSI.

In a fifth possible implementation manner of the fourth aspect, each channel quality measurement process in the M channel quality measurement processes includes an identification field, the identification field includes channel quality measurement process identification information that is used to indicate a type to which the channel quality measurement process belongs, and identification information in channel quality measurement processes of a same type is the same.

In a sixth possible implementation manner of the fourth aspect, the time unit set is notified by the base station to the UE by using higher layer signaling or a control channel.

With reference to any one of the fourth aspect or the first to the sixth possible implementation manners of the fourth aspect, in a seventh possible implementation manner of the fourth aspect, the time unit set is periodically or non-periodically notified by the base station to the UE.

According to a fifth aspect, a base station is provided, including:

a sending unit, configured to send M reference signals to user equipment UE in N time units in a time unit set, where the reference signal is used by the UE to perform channel quality measurement, and each reference signal in the M reference signals is corresponding to one piece of precoding matrix information;

a receiving unit, configured to receive channel quality indication information sent by the UE, where the channel quality indication information is determined by the UE according to the M reference signals; and a selection unit, configured to select an optimal reference signal resource for the UE according to the channel quality indication information; where the sending unit is configured to send an optimal reference signal to the UE according to the optimal reference signal resource.

In a first possible implementation manner of the fifth aspect, the sending unit is further configured to send resource configuration information of the M reference signals to the UE in the N time units in the time unit set, where the resource configuration information of the reference signals includes at least one piece of port information of the reference signals, number information of the reference signals, or precoding information corresponding to the reference signals.

In a second possible implementation manner of the fifth aspect, the channel quality indication information includes M channel quality measurement results, an optimal channel quality measurement result, or a reference signal number.

In a third possible implementation manner of the fifth aspect, the time unit set is notified by the base station to the UE by using higher layer signaling or a control channel.

In a fourth possible implementation manner of the fifth aspect, the reference signal includes a cell-specific reference signal or a user-specific reference signal.

With reference to the first possible implementation manner of the fifth aspect, in a fifth possible implementation manner of the fifth aspect, when the reference signal is a cell-specific reference signal, the base station indicates the resource configuration information of the reference signals by using a broadcast channel.

With reference to any one of the fifth aspect or the first to the fifth possible implementation manners of the fifth aspect, in a sixth possible implementation manner of the fifth aspect, the time unit set is periodically or non-periodically notified by the base station to the UE.

In a seventh possible implementation manner of the fifth aspect, when sending the optimal reference signal to the UE according to the optimal reference signal resource, the sending unit is specifically configured to:

send the optimal reference signal to the UE according to the optimal reference signal resource in each time unit that is after the time unit set and before a next time unit set is configured.

According to a sixth aspect, user equipment is provided, including:

a receiving unit, configured to receive M reference signals sent by a base station in N time units in a time unit set, where each reference signal in the M reference signals is corresponding to one piece of precoding matrix information; and a selection unit, configured to report channel quality indication information to the base station based on the M reference signals received by the receiving unit, so that the base station selects an optimal reference signal resource for the UE according to the channel quality indication information; where the receiving unit is further configured to receive an optimal reference signal sent by the base station according to the optimal reference signal resource.

In a first possible implementation manner of the sixth aspect, the receiving unit is further configured to receive resource configuration information of the M reference signals that is sent by the base station in the N time units in the time unit set, where the resource configuration information of the reference signals includes at least one piece of port information of the reference signals, number information of the reference signals, or precoding information corresponding to the reference signals.

In a second possible implementation manner of the sixth aspect, the channel quality indication information includes M channel quality measurement results, an optimal channel quality measurement result, or a reference signal number.

In a third possible implementation manner of the sixth aspect, the time unit set is notified by the base station to the UE by using higher layer signaling or a control channel.

In a fourth possible implementation manner of the sixth aspect, the reference signal includes a cell-specific reference signal or a user-specific reference signal.

With reference to the first possible implementation manner of the sixth aspect, in a fifth possible implementation manner of the sixth aspect, when the reference signal is a cell-specific reference signal, the user equipment further includes:

a detection unit, configured to detect a broadcast channel to obtain the resource configuration information of the reference signals.

With reference to any one of the sixth aspect or the first to the fifth possible implementation manners of the sixth aspect, in a sixth possible implementation manner of the sixth aspect, the time unit set is periodically or non-periodically notified by the base station to the UE.

In a seventh possible implementation manner of the sixth aspect, when receiving the optimal reference signal sent by the base station according to the optimal reference signal resource, the receiving unit is specifically configured to:

receive, in each time unit that is after the time unit set and before a next time unit set is configured, the optimal reference signal sent by the base station according to the optimal reference signal resource.

According to a seventh aspect, a base station is provided, including:

a configuration unit, configured to configure M channel quality measurement processes for a user terminal UE in N time units in a time unit set, where each channel quality measurement process is corresponding to one piece of reference signal configuration information, the reference signal configuration information is used by the UE to perform channel quality measurement based on a configured reference signal, the M channel quality measurement processes include L types of channel quality measurement processes, each type of channel quality measurement process includes a maximum of N channel quality measurement processes, and $L<=M<=L*N$.

In a first possible implementation manner of the seventh aspect, each channel quality measurement process in the L types of channel quality measurement processes is corresponding to one piece of precoding matrix information, and precoding matrix information corresponding to the any two types of channel quality measurement processes is different.

With reference to the seventh aspect or the first possible implementation manner of the seventh aspect, in a second possible implementation manner of the seventh aspect, each type of channel quality measurement process in the L types of channel quality measurement processes is corresponding to one channel quality measurement result, and the channel quality measurement result corresponding to each type of channel quality measurement process is obtained by the UE or the base station based on channel quality measurement results in all channel quality measurement processes that belong to the type and that are in the M channel quality measurement processes.

With reference to the second possible implementation manner of the seventh aspect, in a third possible implementation manner of the seventh aspect, the base station further includes:

a selection unit, configured to select an optimal type of channel quality measurement process according to channel quality measurement results corresponding to the L types of channel quality measurement processes; and a sending unit, configured to send a reference signal to the UE according to reference signal configuration information corresponding to the type of channel quality measurement process.

With reference to the second possible implementation manner or the third possible implementation manner of the seventh aspect, in a fourth possible implementation manner of the seventh aspect, the channel quality measurement result includes at least one of a channel quality indicator CQI, a precoding matrix indicator PMI, a rank indicator RI, reference signal received power RSRP, reference signal received quality RSRQ, or a reference signal strength indicator RSSI.

In a fifth possible implementation manner of the seventh aspect, each channel quality measurement process in the M channel quality measurement processes includes an identification field, the identification field includes channel quality measurement process identification information that is used to indicate a type to which the channel quality measurement process belongs, and identification information in channel quality measurement processes of a same type is the same.

In a sixth possible implementation manner of the seventh aspect, the time unit set is notified by the base station to the UE by using higher layer signaling or a control channel.

With reference to any one of the seventh aspect or the first to the sixth possible implementation manners of the seventh aspect, in a seventh possible implementation manner of the seventh aspect, the time unit set is periodically or non-periodically notified by the base station to the UE.

According to an eighth aspect, user equipment is provided, including:

a receiving unit, configured to receive, in N time units in a time unit set, M channel quality measurement processes configured by a base station, where each channel quality measurement process is corresponding to one piece of reference signal configuration information, the M channel quality measurement processes include L types of channel quality measurement processes, each type of channel quality measurement process includes a maximum of N channel quality measurement processes, and $L<=M<=L*N$; and a measurement unit, configured to perform channel quality measurement based on the M configured channel quality measurement processes received by the receiving unit and a reference signal corresponding to each channel quality measurement process.

In a first possible implementation manner of the eighth aspect, each channel quality measurement process in the L types of channel quality measurement processes is corresponding to one piece of precoding matrix information, and precoding matrix information corresponding to the any two types of channel quality measurement processes is different.

With reference to the eighth aspect or the first possible implementation manner of the eighth aspect, in a second possible implementation manner of the eighth aspect, each type of channel quality measurement process in the L types of channel quality measurement processes is corresponding to one channel quality measurement result, and the channel quality measurement result corresponding to each type of channel quality measurement process is obtained by the UE or the base station based on channel quality measurement results in all channel quality measurement processes that belong to the type and that are in the M channel quality measurement processes.

With reference to the second possible implementation manner of the eighth aspect, in a third possible implementation manner of the eighth aspect, the user equipment further includes:

a report unit, configured to report channel quality measurement results corresponding to the L types of channel quality measurement processes to the base station, so that the base station selects an optimal type of channel quality measurement process according to the channel quality measurement results corresponding to the L types of channel quality measurement processes; wherein the receiving unit is further configured to receive a reference signal sent by the base station according to reference signal configuration information corresponding to the selected optimal type of channel quality measurement process.

With reference to the second possible implementation manner or the third possible implementation manner of the eighth aspect, in a fourth possible implementation manner of the eighth aspect, the channel quality measurement result includes at least one of a channel quality indicator CQI, a precoding matrix indicator PMI, a rank indicator RI, reference signal received power RSRP, reference signal received quality RSRQ, or a reference signal strength indicator RSSI.

In a fifth possible implementation manner of the eighth aspect, each channel quality measurement process in the M channel quality measurement processes includes an identification field, the identification field includes channel quality measurement process identification information that is used to indicate a type to which the channel quality measurement process belongs, and identification information in channel quality measurement processes of a same type is the same.

In a sixth possible implementation manner of the eighth aspect, the time unit set is notified by the base station to the UE by using higher layer signaling or a control channel.

With reference to any one of the eighth aspect or the first to the sixth possible implementation manners of the eighth aspect, in a seventh possible implementation manner of the eighth aspect, the time unit set is periodically or non-periodically notified by the base station to the UE.

According to a ninth aspect, a base station is provided, including:

a communications unit, configured to communicate with an external device; and a processor, configured to:

send M reference signals to user equipment UE in N time units in a time unit set, where the reference signal is used by the UE to perform channel quality measurement, and each reference signal in the M reference signals is corresponding to one piece of precoding matrix information;

receive, by using the communications unit, channel quality indication information sent by the UE, where the channel quality indication information is determined by the UE according to the M reference signals;

select an optimal reference signal resource for the UE according to the channel quality indication information; and send an optimal reference signal to the UE according to the optimal reference signal resource by using the communications unit.

In a first possible implementation manner of the ninth aspect, the processor is further configured to send resource configuration information of the M reference signals to the UE in the N time units in the time unit set by using the communications unit, where the resource configuration information of the reference signals includes at least one piece of port information of the reference signals, number information of the reference signals, or precoding information corresponding to the reference signals.

In a second possible implementation manner of the ninth aspect, the channel quality indication information includes M channel quality measurement results, an optimal channel quality measurement result, or a reference signal number.

In a third possible implementation manner of the ninth aspect, the time unit set is notified by the base station to the UE by using higher layer signaling or a control channel.

In a fourth possible implementation manner of the ninth aspect, the reference signal includes a cell-specific reference signal or a user-specific reference signal.

With reference to the first possible implementation manner of the ninth aspect, in a fifth possible implementation manner of the ninth aspect, when the reference signal is a cell-specific reference signal, the base station indicates the resource configuration information of the reference signals by using a broadcast channel.

With reference to any one of the ninth aspect or the first to the fifth possible implementation manners of the ninth aspect, in a sixth possible implementation manner of the ninth aspect, the time unit set is periodically or non-periodically notified by the base station to the UE.

In a seventh possible implementation manner of the ninth aspect, when sending the optimal reference signal to the UE according to the optimal reference signal resource by using the communications unit, the processor is specifically configured to:

send, by using the communications unit, the optimal reference signal to the UE according to the optimal reference signal resource in each time unit that is after the time unit set and before a next time unit set is configured.

According to a tenth aspect, user equipment is provided, including:

a communications unit, configured to communicate with an external device; and a processor, configured to:

receive, by using the communications unit, M reference signals sent by a base station in N time units in a time unit set, where each reference signal in the M reference signals is corresponding to one piece of precoding matrix information;

report channel quality indication information to the base station based on the M reference signals, so that the base station selects an optimal reference signal resource for the UE according to the channel quality indication information; and receive, by using the communications unit, an optimal reference signal sent by the base station according to the optimal reference signal resource.

In a first possible implementation manner of the tenth aspect, the processor is further configured to receive, by using the communications unit, resource configuration information of the M reference signals that is sent by the base station in the N time units in the time unit set, where the resource configuration information of the reference signals includes at least one piece of port information of the reference signals, number information of the reference signals, or precoding information corresponding to the reference signals.

In a second possible implementation manner of the tenth aspect, the channel quality indication information includes M channel quality measurement results, an optimal channel quality measurement result, or a reference signal number.

In a third possible implementation manner of the tenth aspect, the time unit set is notified by the base station to the UE by using higher layer signaling or a control channel.

In a fourth possible implementation manner of the tenth aspect, the reference signal includes a cell-specific reference signal or a user-specific reference signal.

With reference to the first possible implementation manner of the tenth aspect, in a fifth possible implementation manner of the tenth aspect, when the reference signal is a cell-specific reference signal, the processor is further configured to detect a broadcast channel to obtain the resource configuration information of the reference signals.

With reference to any one of the tenth aspect or the first to the fifth possible implementation manners of the tenth aspect, in a sixth possible implementation manner of the tenth aspect, the time unit set is periodically or non-periodically notified by the base station to the UE.

In a seventh possible implementation manner of the tenth aspect, when receiving, by using the communications unit, the optimal reference signal sent by the base station according to the optimal reference signal resource, the processor is specifically configured to:

in each time unit that is after the time unit set and before a next time unit set is configured, receive, by using the communications unit, the optimal reference signal sent by the base station according to the optimal reference signal resource.

According to an eleventh aspect, a base station is provided, including:

a communications unit, configured to communicate with an external device; and a processor, configured to:

configure, by using the communications unit, M channel quality measurement processes for a user terminal UE in N time units in a time unit set, where each channel quality measurement process is corresponding to one piece of reference signal configuration information, the reference signal configuration information is used by the UE to perform channel quality measurement based on a configured reference signal, the M channel quality measurement processes include L types of channel quality measurement processes, each type of channel quality measurement process includes a maximum of N channel quality measurement processes, and L<=M<=L*N.

In a first possible implementation manner of the eleventh aspect, each channel quality measurement process in the L types of channel quality measurement processes is corresponding to one piece of precoding matrix information, and precoding matrix information corresponding to the any two types of channel quality measurement processes is different.

With reference to the eleventh aspect or the first possible implementation manner of the eleventh aspect, in a second possible implementation manner of the eleventh aspect, each type of channel quality measurement process in the L types of channel quality measurement processes is corresponding to one channel quality measurement result, and the channel quality measurement result corresponding to each type of channel quality measurement process is obtained by the UE or the base station based on channel quality measurement results in all channel quality measurement processes that belong to the type and that are in the M channel quality measurement processes.

With reference to the second possible implementation manner of the eleventh aspect, in a third possible implementation manner of the eleventh aspect, the processor is further configured to: select an optimal type of channel quality measurement process according to channel quality measurement results corresponding to the L types of channel quality measurement processes; and send, by using the communications unit, a reference signal to the UE according to reference signal configuration information corresponding to the type of channel quality measurement process.

With reference to the second possible implementation manner or the third possible implementation manner of the eleventh aspect, in a fourth possible implementation manner of the eleventh aspect, the channel quality measurement result includes at least one of a channel quality indicator CQI, a precoding matrix indicator PMI, a rank indicator RI, reference signal received power RSRP, reference signal received quality RSRQ, or a reference signal strength indicator RSSI.

In a fifth possible implementation manner of the eleventh aspect, each channel quality measurement process in the M channel quality measurement processes includes an identification field, the identification field includes channel quality measurement process identification information that is used to indicate a type to which the channel quality measurement process belongs, and identification information in channel quality measurement processes of a same type is the same.

In a sixth possible implementation manner of the eleventh aspect, the time unit set is notified by the base station to the UE by using higher layer signaling or a control channel.

With reference to any one of the eleventh aspect or the first to the sixth possible implementation manners of the eleventh aspect, in a seventh possible implementation manner of the eleventh aspect, the time unit set is periodically or non-periodically notified by the base station to the UE.

According to a twelfth aspect, user equipment is provided, including:

a communications unit, configured to communicate with an external device; and a processor, configured to:

receive, in N time units in a time unit set by using the communications unit, M channel quality measurement processes configured by a base station, where each channel quality measurement process is corresponding to one piece of reference signal configuration information, the M channel quality measurement processes include L types of channel quality measurement processes, each type of channel quality measurement process includes a maximum of N channel quality measurement processes, and $L<=M<=L*N$; and perform channel quality measurement based on the M configured channel quality measurement processes and a reference signal corresponding to each channel quality measurement process.

In a first possible implementation manner of the twelfth aspect, each channel quality measurement process in the L types of channel quality measurement processes is corresponding to one piece of precoding matrix information, and precoding matrix information corresponding to the any two types of channel quality measurement processes is different.

With reference to the twelfth aspect or the first possible implementation manner of the twelfth aspect, in a second possible implementation manner of the twelfth aspect, each type of channel quality measurement process in the L types of channel quality measurement processes is corresponding to one channel quality measurement result, and the channel quality measurement result corresponding to each type of channel quality measurement process is obtained by the UE or the base station based on channel quality measurement results in all channel quality measurement processes that belong to the type and that are in the M channel quality measurement processes.

With reference to the second possible implementation manner of the twelfth aspect, in a third possible implementation manner of the twelfth aspect, the processor is further configured to: report, by using the communications unit, channel quality measurement results corresponding to the L types of channel quality measurement processes to the base station, so that the base station selects an optimal type of channel quality measurement process according to the channel quality measurement results corresponding to the L types of channel quality measurement processes; and receive, by using the communications unit, a reference signal sent by the base station according to reference signal configuration information corresponding to the selected optimal type of channel quality measurement process.

With reference to the second possible implementation manner or the third possible implementation manner of the twelfth aspect, in a fourth possible implementation manner of the twelfth aspect, the channel quality measurement result includes at least one of a channel quality indicator CQI, a precoding matrix indicator PMI, a rank indicator RI, reference signal received power RSRP, reference signal received quality RSRQ, or a reference signal strength indicator RSSI.

In a fifth possible implementation manner of the twelfth aspect, each channel quality measurement process in the M channel quality measurement processes includes an identification field, the identification field includes channel quality measurement process identification information that is used to indicate a type to which the channel quality measurement process belongs, and identification information in channel quality measurement processes of a same type is the same.

In a sixth possible implementation manner of the twelfth aspect, the time unit set is notified by the base station to the UE by using higher layer signaling or a control channel.

With reference to any one of the twelfth aspect or the first to the sixth possible implementation manners of the twelfth aspect, in a seventh possible implementation manner of the twelfth aspect, the time unit set is periodically or non-periodically notified by the base station to the UE.

According to the resource configuration method, the user equipment, and the base station provided in the embodiments of the present invention, a base station needs to send only M reference signals to UE in N time units in a configured time unit set. After receiving the M reference signals, the UE performs channel quality measurement M times based on the M different reference signals to obtain M channel quality measurement results, and sends channel quality indication information to the base station according to the M channel quality measurement results. The base station selects an optimal reference signal for the UE according to the channel quality indication information, and sends the optimal reference signal to the UE. Compared with the prior art in which to configure a best reference signal for UE, a base station needs to configure reference signals corresponding to all possible combinations for the UE, to enable the UE to separately perform channel quality measurement and feedback, in the solutions provided in the present invention, the M different reference signals are configured for the UE in the N time units in the configured time unit set, so that configuration of unnecessary reference signals by the base station is reduced. Therefore, reference signals and overheads of corresponding measurement and feedback are reduced, and resources are saved.

BRIEF DESCRIPTION OF THE DRAWINGS

To describe technical solutions in embodiments of the present invention more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

FIG. 3 is a schematic flowchart of still another resource configuration method according to an embodiment of the present invention;

FIG. 4 is a schematic flowchart of yet another resource configuration method according to an embodiment of the present invention;

FIG. 5 is a schematic flowchart of a resource configuration method according to an embodiment of the present invention;

DETAILED DESCRIPTION

The following clearly describes technical solutions in embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 1:
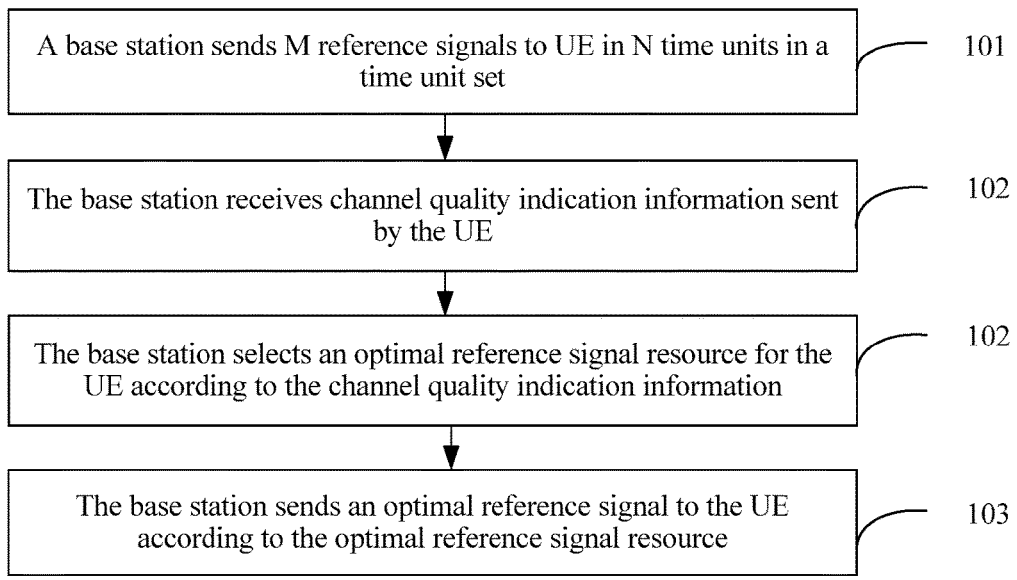
FIG. 1 is a schematic flowchart of a resource configuration method according to an embodiment of the present invention.

An embodiment of the present invention provides a resource configuration method, and the method may be implemented by a base station. As shown in FIG. 1, the method specifically includes the following steps.

101. The base station sends M reference signals to UE in N time units in a time unit set.

The reference signal is used by the UE to perform channel quality measurement and reporting. Specifically, each reference signal in the M reference signals is corresponding to one piece of precoding matrix information, and the precoding matrix information in each reference signal may be reference signal beam information corresponding to the reference signal. In addition, each reference signal is corresponding to one reference signal that is based on a different beam, that is, reference signal associated with a weighting coefficient corresponding to a different beam. Specifically, the reference signal includes a cell-specific reference signal (for example, a cell-specific reference signal (Cell-specific Reference Signal, CRS for short) resource) or a user-specific reference signal (a channel state information-reference signal (Channel State Information Reference Signal, CSI-RS for short) resource). This is not limited in the present invention.

For example, the time unit set may be a restrictive measurement subframe set configured by the base station for the UE. The base station sends the M reference signals to the UE in N subframes in the restrictive measurement subframe set. The N subframes may be N consecutive subframes or N inconsecutive subframes. This is not limited herein. Specifically, the base station sends at least one reference signal to the UE in each subframe. After receiving the reference signal, the UE performs corresponding channel quality measurement and reporting in the subframe according to the reference signal.

Optionally, the time unit set is periodically or non-periodically notified by the base station to the UE.

Specifically, when the base station configures the UE to perform channel quality measurement and reporting in the time unit set, the base station may periodically configure, according to a predetermined period, the UE to perform channel quality measurement and reporting in the time unit set. The predetermined period refers to a long period configured by the base station for the UE to perform channel quality measurement and reporting in a time unit set. The UE performs channel quality measurement and reporting in the time unit set according to the predetermined period. Alternatively, the base station may configure trigger signaling for the UE, so that the UE performs channel quality measurement and reporting in the time unit set according to an indication of the trigger signaling.

Optionally, the time unit set is notified by the base station to the UE by using a control channel or higher layer signaling.

For example, the time unit set may be notified by the base station to the UE by using the control channel. For example, the base station may add trigger signaling to a downlink control information format (Downlink Control Information Format, DCI format for short) of a physical downlink control channel (Physical Downlink Control Channel, PDCCH for short) and send the DCI format to the UE, so that the UE learns, according to a trigger identifier in the trigger signaling, of the time unit set configured by the base station. Alternatively, the time unit set may be notified by the base station to the UE by using the higher layer signaling. For example, the base station sends trigger signaling to the UE by using radio resource control (Radio Resource Control, RRC for short) signaling, so that the UE learns of the time unit set according to a trigger identifier in the trigger signaling.

Optionally, before step 101, the method further includes the following step:

101a. The base station sends resource configuration information of the M reference signals to the UE in the N time units in the time unit set.

The resource configuration information of the reference signals refers to necessary information required by the base station for sending the reference signals on M configured reference signal ports. Specifically, the resource configuration information of the reference signals includes at least one piece of port information of the reference signals, number information of the reference signals, or precoding information corresponding to the reference signals. The UE can receive, only according to the resource configuration information of the reference signals, the M reference signals sent by the base station.

Further, optionally, when the reference signal is a cell-specific reference signal, to enable the UE to distinguish different reference signal configuration types (that is, different pieces of reference signal configuration information corresponding to different beams), the base station may indicate the resource configuration information of the reference signals by using a broadcast channel.

For example, if a reference signal corresponding to the cell-specific reference signal is a CRS, to enable the UE to distinguish different pieces of CRS configuration information, the base station needs to add, to a broadcast channel in a corresponding time unit in the time unit set, a CRS configuration field including a CRS indication identifier, so as to indicate configuration information of the CRS, so that the UE can perform blind detection on the corresponding broadcast channel to obtain the CRS configuration information corresponding to a CRS resource in the time unit. The broadcast channel includes a PBCH channel.

It should be noted that when the measurement reference signal is a user-specific reference signal, in a time unit that is in the time unit set and for transmitting the user-specific reference signal (for example, a CSI-RS), the base station needs to simultaneously send a cell-specific reference signal (for example, a CRS) in the time unit. When the measurement reference signal is a cell-specific reference signal, the base station needs to send only the cell-specific reference signal in each time unit in the time unit set.

102. The base station receives channel quality indication information sent by the UE.

The channel quality indication information is determined by the UE according to the M reference signals. The channel quality indication information includes M channel quality measurement results, an optimal channel quality measurement result, or a reference signal number.

The channel quality measurement result includes at least one piece of measurement information. The measurement information in the channel quality measurement result includes at least one of a channel quality indicator (Channel Quality Information, CQI for short), a precoding matrix indicator (Precoding Matrix Indicator, PMI for short), a rank indicator (Rank Indicator, RI for short), reference signal received power (Reference Signal Received Power, RSRP for short), reference signal received quality (Reference Signal Received Quality, RSRQ for short), or a reference signal strength indicator (Reference Signal Strength Indicator, RSSI for short). For example, if the channel quality measurement is CSI measurement, the UE obtains M CSI measurement results after performing CSI measurement M times according to the M reference signals.

103. The base station selects an optimal reference signal resource for the UE according to the channel quality indication information.

104. The base station sends an optimal reference signal to the UE according to the optimal reference signal resource.

Optionally, step 104 specifically includes the following step:

104a. The base station sends the optimal reference signal to the UE according to the optimal reference signal resource in each time unit that is after the time unit set and before a next time unit set is configured.

For example, when selecting the optimal reference signal configuration resource for the UE according to the M channel quality measurement results, the base station may directly select any piece of measurement information in the M channel quality measurement results, or may select at least two pieces of measurement information in the channel quality measurement results for comprehensive selection. For example, CSI measurement is used as an example. When the base station selects an optimal reference signal for the UE according to CQIs in CSI measurement results, the base station may directly use a reference signal corresponding to a maximum CQI value in M CSI measurement results as the optimal reference signal, and allocate the optimal reference signal to the UE.

According to the resource configuration method provided in this embodiment of the present invention, a base station needs to send only M reference signals to UE in N time units in a configured time unit set. After receiving the M reference signals, the UE performs channel quality measurement M times based on the M different reference signals to obtain M channel quality measurement results, and sends channel quality indication information to the base station according to the M channel quality measurement results. The base station selects an optimal reference signal for the UE according to the channel quality indication information, and sends the optimal reference signal to the UE. Compared with the prior art in which to configure a best reference signal for UE, a base station needs to configure reference signals corresponding to all possible combinations for the UE, to enable the UE to separately perform channel quality measurement and feedback, in the solution provided in the present invention, the M different reference signals are configured for the UE in the N time units in the configured time unit set, so that configuration of unnecessary reference signals by the base station is reduced. Therefore, reference signals and overheads of corresponding measurement and feedback are reduced, and resources are saved.

An embodiment of the present invention provides a channel quality measurement method. For descriptions of a technical term, a concept, and the like that are in Embodiment 2 and related to Embodiment 1, refer to the descriptions in Embodiment 1. Details are not described again in this embodiment.

Figure 2:
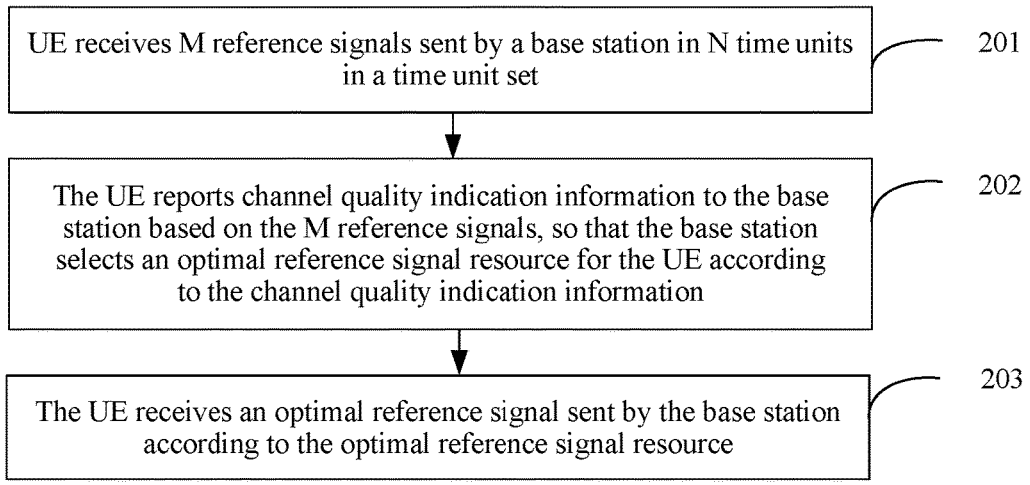
FIG. 2 is a schematic flowchart of another resource configuration method according to an embodiment of the present invention.

This embodiment may be implemented by UE. Specifically, as shown in FIG. 2, the channel quality measurement method specifically includes the following steps.

201. The UE receives M reference signals sent by a base station in N time units in a time unit set.

Specifically, the time unit set is periodically or non-periodically notified by the base station to the UE. In addition, the time unit set is notified by the base station to the UE by using higher layer signaling or a control channel.

Optionally, before step 201, the method further includes the following step:

201a. The UE receives resource configuration information of the M reference signals that is sent by the base station in the N time units in the time unit set.

The resource configuration information of the reference signals refers to necessary information required by the base station for sending the reference signals on M configured reference signal ports. Specifically, the resource configuration information of the reference signals includes at least one piece of port information of the reference signals, number information of the reference signals, or precoding information corresponding to the reference signals. The UE can receive, only according to the configuration information of the reference signals, the M reference signals sent by the base station.

Optionally, when the reference signal is a cell-specific reference signal, after step 201, the method further includes the following content:

201b. The UE detects a broadcast channel to obtain the resource configuration information of the reference signals.

For example, if a reference signal corresponding to the cell-specific reference signal is a CRS, to be able to distinguish different pieces of CRS configuration information, the UE needs to perform blind detection on a broadcast channel corresponding to the base station in each time unit, to obtain a CRS indication identifier included in a CRS configuration field in each broadcast channel, and obtains, in each time unit according to an indication of the CRS indication identifier, CRS configuration information corresponding to the CRS. The broadcast channel includes a PBCH channel.

202. The UE reports channel quality indication information to the base station based on the M reference signals, so that the base station selects an optimal reference signal resource for the UE according to the channel quality indication information.

The channel quality indication information is determined by the UE according to the M reference signals. The channel quality indication information includes M channel quality measurement results, an optimal channel quality measurement result, or a reference signal number.

203. The UE receives an optimal reference signal sent by the base station according to the optimal reference signal resource.

Optionally, step 203 specifically includes the following content:

203a. The UE receives, in each time unit that is after the time unit set and before a next time unit set is configured, the optimal reference signal sent by the base station according to the optimal reference signal resource.

According to the channel quality measurement method provided in this embodiment of the present invention, UE receives M reference signals sent by a base station in N time units in a configured time unit set, performs channel quality measurement M times based on the M different reference signals to obtain M channel quality measurement results, and obtains channel quality indication information according to the M channel quality measurement results, so that the base station selects an optimal reference signal for the UE according to the channel quality indication information, and sends the optimal reference signal to the UE. Compared with the prior art in which to configure a best reference signal for UE, a base station needs to configure reference signals corresponding to all possible combinations for the UE, to enable the UE to separately perform channel quality measurement and feedback, in the solution provided in the present invention, the M different reference signals are configured for the UE in the N time units in the configured time unit set, and in a time unit outside the configured time unit set, the base station configures, for the UE, only the optimal reference signal selected from the M reference signals, so that configuration of unnecessary reference signals by the base station is reduced. Therefore, reference signals and overheads of corresponding measurement and feedback are reduced, and resources are saved.

The following describes, in a specific scenario, an example of a resource configuration and channel quality measurement method provided in an embodiment of the present invention. For descriptions of a technical term, a concept, and the like that are in the following embodiments and related to the foregoing embodiments, refer to the foregoing embodiments.

For example, if N=6 (for a specific application scenario, refer to the 3D UMi scenario described in the background), virtual weighting is performed on vertical-direction antenna elements in each column by using a drive network, to obtain six different beams. Based on the six beams, a corresponding virtual weighting matrix may be designed as:

$$Q' = \begin{pmatrix} A_1 & 0 & A_2 & 0 & A_1 & A_2 \\ 0 & A_1 & 0 & A_2 & \alpha_1 A_1 & \alpha_2 A_2 \end{pmatrix}.$$

Each column in the matrix is corresponding to one vertical-direction beam of a port, and each beam is corresponding to one direction and one width. $\alpha_1$ and $\alpha_2$ are complex value weighting coefficients, $A_1$ is a downtilt beam vector pointing to 12 degrees, and $A_2$ is a downtilt beam vector pointing to −6 degrees. Specifically, the first column and the second column in the matrix are corresponding to a wide beam pointing to 12 degrees in a maximum value direction. The third column and the fourth column in the matrix are corresponding to a wide beam pointing to −6 degrees in a maximum value direction. The fifth column in the matrix is corresponding to a narrow beam pointing to 12 degrees in a maximum value direction. The sixth column in the matrix is corresponding to a narrow beam pointing to −6 degrees in a maximum value direction.

Based on the foregoing content, if a reference signal in this embodiment is a cell-specific reference signal such as a CRS or a user-specific reference signal such as a CSI-RS, as shown in FIG. 3, the resource configuration and channel quality measurement method provided in this embodiment of the present invention specifically includes the following steps:

a1. A base station separately sends six different CSI-RSs or CRSs to UE in six subframes in a restrictive measurement subframe set according to the six different beams.

a2. The UE performs CSI measurement six times in the restrictive measurement subframe set based on the six CRSs or CSI-RSs to obtain six CSI measurement results.

a3. The UE reports the six CSI measurement results to the base station, and the base station selects an optimal reference signal for the UE based on the six CSI results; or the UE reports an optimal CSI measurement result in the six CSI measurement results to the base station, and the base station selects an optimal reference signal for the UE based on the optimal CSI measurement result; or the UE reports a CRS or CSI-RS number corresponding to an optimal CSI measurement result in the six CSI measurement results to the base station, and the base station selects an optimal reference signal for the UE based on the CRS or CSI-RS number corresponding to the optimal CSI measurement result.

a4. The base station sends the optimal CRS or CSI-RS to the UE.

Specifically, the base station obtains a CQI value in each CSI measurement result in the six CSI measurement results fed back by the UE in step a3, and sends a CSR or CSI-RS corresponding to a CSI measurement result with a maximum CQI value, a measurement result of an optimal CRS or CSI-RS, or a number of an optimal CRS or CSI-RS to the UE, so that the UE receives, in each subframe that is after the restrictive measurement subframe set and before a next restrictive measurement subframe set is configured, an optimal CRS or CSI-RS configuration sent by the base station, and performs CSI measurement and reporting according to the optimal CRS or CSI-RS configuration.

Optionally, the UE may report, to the base station according to a CQI value in each CSI measurement result in the six CSI measurement results, a CSI measurement result with a maximum CQI value or a CSR or CSI-RS number corresponding to the CSI measurement result with a maximum CQI value. The base station obtains the optimal CSI measurement result or the number of the optimal CRS or CSI-RS that is fed back by the UE in step a3, and sends an optimal CRS or CSI-RS resource to the UE according to this, so that the UE receives, in each subframe that is after the restrictive measurement subframe set and before a next restrictive measurement subframe set is configured, an optimal CRS or CSI-RS configuration sent by the base station, and performs CSI measurement and reporting according to the optimal CRS or CSI-RS configuration.

According to the resource configuration and channel quality measurement method provided in this embodiment of the present invention, UE receives six CRSs or CSI-RSs sent by a base station in six subframes in a configured restrictive measurement subframe set, and performs CSI measurement N times based on the six different CRSs or CSI-RSs to obtain six CSI measurement results. The base station selects an optimal CRS or CSI-RS for the UE based on the six CSI measurement results, an optimal CSI measurement result reported by the UE, or a CRS or CSI-RS number corresponding to an optimal CSI measurement result; and sends the optimal CRS or CSI-RS to the UE. Compared with the prior art in which to configure a best CRS or CSI-RS for UE, a base station needs to configure CRS or CSI-RS resource configuration information corresponding to all possible combinations in a drive network for the UE, to enable the UE to separately perform channel quality measurement and feedback, in the solution provided in the present invention, the six different CRSs or CSI-RSs are configured for the UE in the six subframes in the configured restrictive measurement subframe set, and in the subframes in the configured restrictive measurement subframe set, the base station configures, for the UE, only the optimal reference signal selected from the M reference signals, so that configuration of unnecessary CRSs or CSI-RSs by the base station is reduced. Therefore, CRSs or CSI-RSs and overheads of corresponding measurement and feedback are reduced, and resources are saved.

An embodiment of the present invention provides a resource configuration method. As shown in FIG. 4, the method may be implemented by a base station, and specifically include the following step.

301. The base station configures M channel quality measurement processes for UE in N time units in a time unit set.

Each channel quality measurement process in the M channel quality measurement processes is corresponding to one piece of reference signal configuration information. The reference signal configuration information is used by the UE to perform channel quality measurement based on a configured reference signal. The M channel quality measurement processes include L types of channel quality measurement processes, each type of channel quality measurement process includes a maximum of N channel quality measurement processes, and $L<=M<=L*N$.

For example, the time unit set may be a restrictive measurement subframe set configured by the base station for the UE. The base station configures the M channel quality measurement processes for the UE in N subframes in the restrictive measurement subframe set. The N subframes may be N consecutive subframes or N inconsecutive subframes. Specifically, the base station configures at least one channel quality measurement process for the UE in each subframe.

Specifically, each channel quality measurement process in the L types of channel quality measurement processes is corresponding to one piece of precoding matrix information, and precoding matrix information corresponding to any two types of channel quality measurement processes is different.

A precoding matrix corresponding to each channel quality measurement process in the L types of channel quality measurement processes may be reference signal beam information corresponding to the channel quality measurement process. In addition, a beam on which a reference signal corresponding to each type of channel quality measurement process is based is different from each other, that is, the reference signal corresponding to each type of channel quality measurement process is associated with a weighting coefficient corresponding to a different beam. Specifically, the reference signal includes a cell-specific reference signal (for example, a cell-specific reference signal (Cell-specific Reference Signal, CRS for short) resource) or a user-specific reference signal (a channel state information-reference signal (Channel State Information Reference Signal, CSI-RS for short) resource). This is not limited in the present invention.

Optionally, the time unit set is periodically or non-periodically notified by the base station to the UE.

Specifically, when the base station configures the UE to perform channel quality measurement and reporting in the time unit set, the base station may periodically configure, according to a predetermined period, the UE to perform channel quality measurement and reporting of the M channel quality measurement processes in the time unit set. The predetermined period refers to a long period configured by the base station for the UE to perform the channel quality measurement and reporting in a time unit set. The UE performs the channel quality measurement and reporting in the time unit set according to the predetermined period. Alternatively, the base station may configure non-periodic trigger signaling for the UE, so that the UE performs the channel quality measurement and reporting in the time unit set according to an indication of the trigger signaling.

Optionally, the time unit set is notified by the base station to the UE by using a control channel or higher layer signaling.

For example, the time unit set may be notified by the base station to the UE by using the control channel. For example, the base station may add trigger signaling to a DCI format of a PDCCH and send the DCI format to the UE, so that the UE learns, according to a trigger identifier in the trigger signaling, of the time unit set configured by the base station. Alternatively, the time unit set may be notified by the base station to the UE by using the higher layer signaling. For example, the base station sends trigger signaling to the UE by using RRC signaling, so that the UE learns of the time unit set according to a trigger identifier in the trigger signaling.

Optionally, each channel quality measurement process in the M channel quality measurement processes includes an identification field. The identification field includes channel quality measurement process identification information. The channel quality measurement process identification information is used to indicate, to the base station or the UE, a type to which the channel quality measurement process belongs. Identification information in channel quality measurement processes of a same type is the same.

Specifically, when a quantity of channel quality measurement processes corresponding to a type of channel quality measurement process is greater than 1, the base station needs to further notify and indicate, to the UE, channel quality measurement processes that belong to the type of channel quality measurement process, and accordingly, needs to add an identification field to each channel quality measurement process in the type of channel quality measurement process, to indicate, to the UE, the type to which the channel quality measurement process belongs. For example, if the channel quality measurement process is a CSI process, the base station may add a domain field such as a channel state information process class identity (CSI-Process-Class Identity) field to each CSI process to indicate a type, in the L types, to which the CSI process belongs.

Optionally, each type of channel quality measurement process in the L types of channel quality measurement processes is corresponding to one channel quality measurement result. The channel quality measurement result corresponding to each type of channel quality measurement process is obtained by the UE or the base station based on channel quality measurement results in all channel quality measurement processes that belong to the type and that are in the M channel quality measurement processes.

The channel quality measurement result includes at least one of a CQI, a PMI, an RI, RSRP, RSRQ, or an RSSI. Specifically, the base station or the UE separately collects statistics about the channel quality measurement results corresponding to all the channel quality measurement processes in each type of channel quality measurement process, so as to obtain the channel quality measurement result corresponding to each type of channel quality measurement process. Each type of channel quality measurement process is corresponding to one channel quality measurement result.

According to the resource configuration method provided in this embodiment of the present invention, a base station configures M channel quality measurement processes for UE in N time units in a configured time unit set. Each channel quality measurement process in the M channel quality measurement processes is corresponding to one piece of reference signal configuration information, the M channel quality measurement processes include L types of channel quality measurement processes, and each type of channel quality measurement process includes a maximum of N channel quality measurement processes. Therefore, based on configuration of the L types of channel quality measurement processes and corresponding channel quality measurement, the base station may select an optimal type of channel quality measurement process for the UE, and further select an optimal reference signal configuration. When configuring a best reference signal for the UE, the base station needs to configure only the optimal channel quality measurement process for the UE in each time unit outside the time unit set, so that the base station reduces reference signals, channel quality measurement processes, and overheads of corresponding measurement and feedback, and resources are saved.

Optionally, as shown in FIG. 5, after step 301, the method provided in this embodiment further includes the following steps:

302. The base station selects an optimal type of channel quality measurement process according to channel quality measurement results corresponding to L types of channel quality measurement processes.

303. The base station sends a reference signal to the UE according to reference signal configuration information corresponding to the type of channel quality measurement process.

According to the further resource configuration method provided in this embodiment of the present invention, a base station configures M channel quality measurement processes for UE in N time units in a configured time unit set. Each channel quality measurement process in the M channel quality measurement processes is corresponding to one piece of reference signal configuration information, the M channel quality measurement processes include L types of channel quality measurement processes, and each type of channel quality measurement process includes a maximum of N channel quality measurement processes. The base station selects an optimal type of channel quality measurement process from a channel quality measurement result corresponding to each type of channel quality measurement process in the L types of channel quality measurement processes, and sends a reference signal to the UE according to reference signal configuration information corresponding to the type of channel quality measurement process, so that configuration of unnecessary reference signals by the base station is reduced. In addition, when the base station configures a best reference signal for the UE, the base station may configure the selected optimal type of channel quality measurement process for the UE in each time unit outside the time unit set, so that the base station reduces reference signals, channel quality measurement processes, and overheads of corresponding measurement and feedback, and resources are saved.

An embodiment of the present invention provides a channel quality measurement method. For descriptions of a technical term, a concept, and the like that are in Embodiment 5 and related to Embodiment 4, refer to the descriptions in Embodiment 4. Details are not described again in this embodiment.

Figure 6:
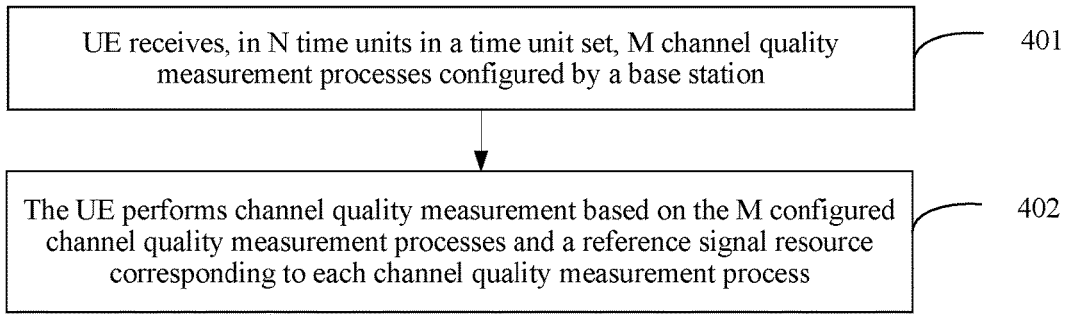
FIG. 6 is a schematic flowchart of another resource configuration method according to an embodiment of the present invention.

This embodiment may be implemented by UE. Specifically, as shown in FIG. 6, the channel quality measurement method specifically includes the following steps.

401. The UE receives, in N time units in a time unit set, M channel quality measurement processes configured by a base station.

Each channel quality measurement process in the M channel quality measurement processes is corresponding to one piece of reference signal configuration information. The reference signal configuration information is used by the UE to perform channel quality measurement based on a configured reference signal. The M channel quality measurement processes include L types of channel quality measurement processes, each type of channel quality measurement process includes a maximum of N channel quality measurement processes, and L<=M<=L*N.

Specifically, the time unit set is notified by the base station to the UE by using higher layer signaling or a control channel. In addition, the time unit set is periodically or non-periodically notified by the base station to the UE.

402. The UE performs channel quality measurement based on the M configured channel quality measurement processes and a reference signal corresponding to each channel quality measurement process.

According to the channel quality measurement method provided in this embodiment of the present invention, UE receives, in N time units in a configured time unit set, M channel quality measurement processes configured by a base station, and performs channel quality measurement based on the M configured channel quality measurement processes and a reference signal corresponding to each channel quality measurement process. Each channel quality measurement process in the M channel quality measurement processes is corresponding to one piece of reference signal configuration information, the M channel quality measurement processes include L types of channel quality measurement processes, and each type of channel quality measurement process includes a maximum of N channel quality measurement processes. Therefore, based on channel quality measurement on the L types of channel quality measurement processes, the UE may separately report a channel quality measurement result corresponding to each type of channel quality measurement process, so that the base station may select an optimal type of channel quality measurement process for the UE, and further select an optimal reference signal configuration. Therefore, when the base station configures a best reference signal for the UE, the base station may configure the optimal type of channel quality measurement process for the UE in each time unit outside the time unit set, so that overheads of corresponding measurement and feedback performed by the UE on the reference signal are reduced, and resources are saved.

Figure 7:
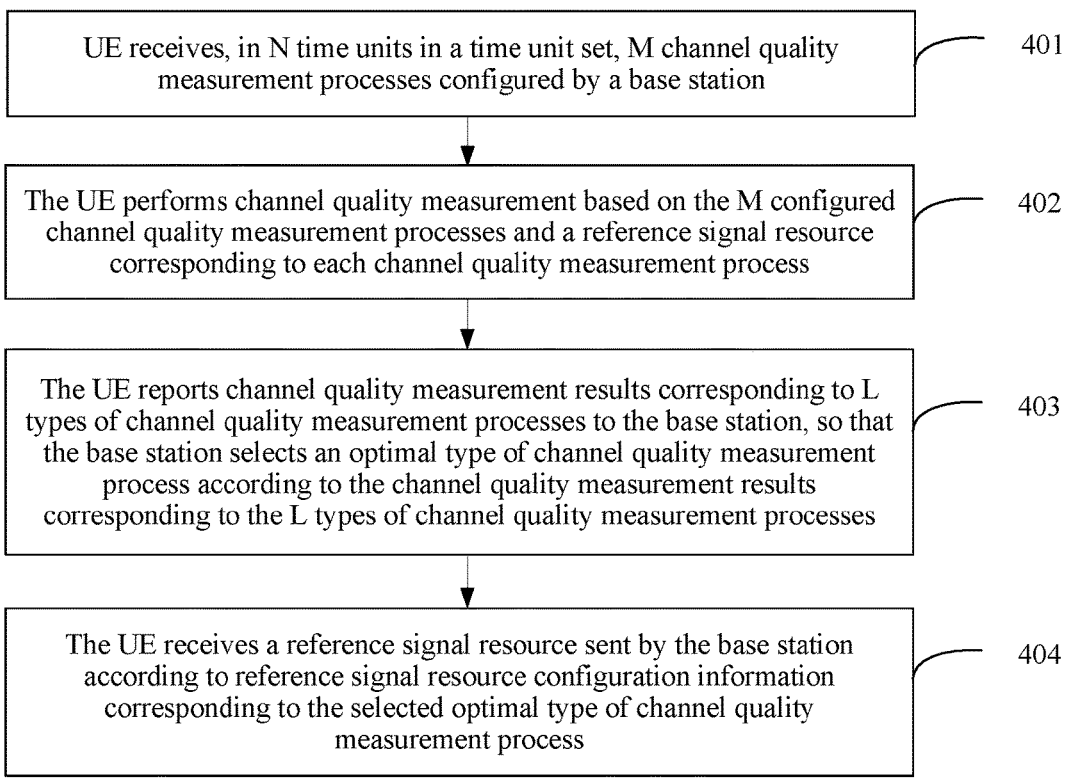
FIG. 7 is a schematic flowchart of still another resource configuration method according to an embodiment of the present invention.

Optionally, as shown in FIG. 7, after step 402, the method further includes the following steps:

403. The UE reports channel quality measurement results corresponding to L types of channel quality measurement processes to the base station, so that the base station selects an optimal type of channel quality measurement process according to the channel quality measurement results corresponding to the L types of channel quality measurement processes.

404. The UE receives a reference signal sent by the base station according to reference signal configuration information corresponding to the selected optimal type of channel quality measurement process.

According to the further channel quality measurement method provided in this embodiment of the present invention, UE receives, in N time units in a configured time unit set, M channel quality measurement processes configured by a base station, and performs channel quality measurement based on the M configured channel quality measurement processes and a reference signal corresponding to each channel quality measurement process. Then, the UE reports channel quality measurement results corresponding to L types of channel quality measurement processes to the base station, so that the base station can select an optimal type of channel quality measurement process based on the channel quality measurement results corresponding to the L types of channel quality measurement processes. Finally, the UE needs to receive only a reference signal sent by the base station according to reference signal configuration information corresponding to the selected optimal type of channel quality measurement process. Therefore, measurement and feedback performed by the UE on unnecessary reference signals are reduced. In addition, when configuring a best reference signal for the UE, the base station may configure the selected optimal type of channel quality measurement process for the UE in each time unit outside the time unit set, so that overheads of corresponding measurement and feedback performed by the UE on the reference signal are reduced, and resources are saved.

The following describes, in a specific scenario, an example of a resource configuration and channel quality measurement method provided in an embodiment of the present invention. For descriptions of a technical term, a concept, and the like that are in the following embodiments and related to the foregoing embodiments, refer to the foregoing embodiments.

For example, if N=6 (for a specific application scenario, refer to the 3DUMi scenario described in the background), virtual weighting is performed on vertical-direction antenna elements in each column by using a drive network, to obtain antenna ports corresponding to six different beams. A virtual weighting matrix corresponding to the six beams may be designed as:

$$Q' = \begin{pmatrix} A_1 & 0 & A_2 & 0 & A_1 & A_2 \\ 0 & A_1 & 0 & A_2 & \alpha_1 A_1 & \alpha_2 A_2 \end{pmatrix}.$$

Each column in the matrix is corresponding to one vertical-direction beam of a single port, and each beam is corresponding to one direction and one width. $\alpha_1$ and $\alpha_2$ are complex value weighting coefficients, $A_1$ is a downtilt beam vector pointing to 12 degrees, and $A_2$ is a downtilt beam vector pointing to −6 degrees. Specifically, the first column and the second column in the matrix are corresponding to a wide beam pointing to 12 degrees in a maximum value direction. The third column and the fourth column in the matrix are corresponding to a wide beam pointing to −6 degrees in a maximum value direction. The fifth column in the matrix is corresponding to a narrow beam pointing to 12 degrees in a maximum value direction. The sixth column in the matrix is corresponding to a narrow beam pointing to −6 degrees in a maximum value direction.

Figure 8:
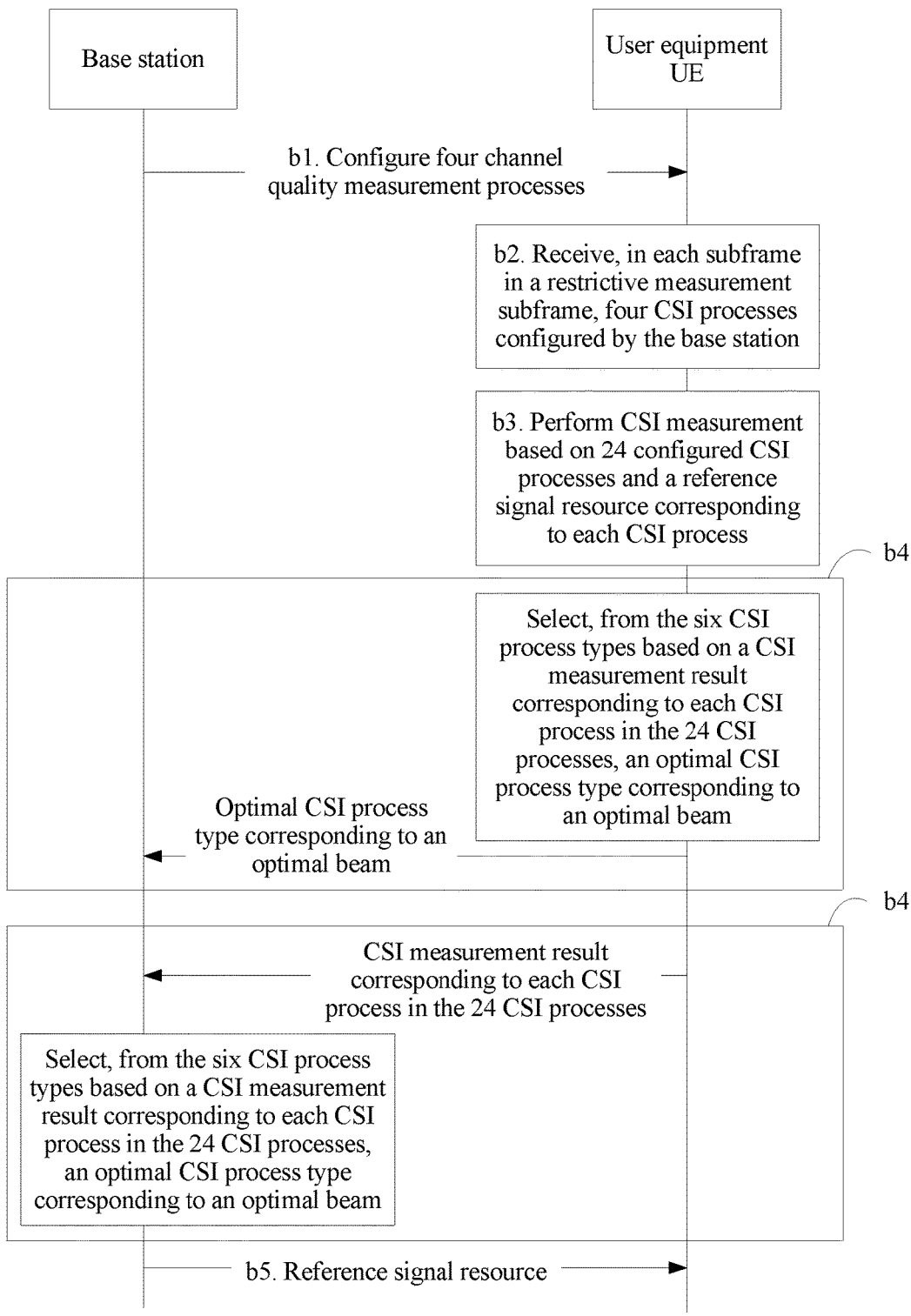
FIG. 8 is a schematic flowchart of yet another resource configuration method according to an embodiment of the present invention.

Based on the foregoing content, if a channel quality measurement process in this embodiment is a CSI process, as shown in FIG. 8, a resource configuration and channel quality measurement method provided in this embodiment of the present invention specifically includes the following steps.

b1. A base station configures four channel quality measurement processes for UE in each subframe in a restrictive measurement subframe set according to the six different beams.

Specifically, based on the six different beams, the base station classifies the 24 CSI processes into six types, and each type is corresponding to one vertical-direction beam.

b2. The UE receives, in each subframe in the restrictive measurement subframe set, the four CSI processes configured by the base station.

b3. The UE performs CSI measurement based on 24 configured CSI processes and a reference signal corresponding to each CSI process.

b4. The UE or the base station selects, from the six CSI process types based on a CSI measurement result corresponding to each type of CSI process in the 24 CSI processes, an optimal CSI process type corresponding to an optimal beam.

For example, when a process described in step b4 is executed by the UE, step b4 specifically includes the following steps.

(1). The UE classifies the 24 CSI processes according to the six different vertical-direction beams in the drive network, where each type of CSI process is corresponding to one vertical-direction beam.

(2). The UE successively combines CSI measurement results corresponding to all CSI processes in each type of CSI process, to obtain a CSI measurement result for each type of CSI process.

Specifically, if a type of CSI process therein is used as an example, and the type of CSI process includes four CSI processes, the UE obtains four CSI measurement results corresponding to the four CSI processes, and then performs preferential combination on the four CSI measurement results, so as to obtain a CSI measurement result for the type of CSI process.

Specifically, if a CSI measurement result corresponding to a CSI process in this embodiment includes at least one of a CQI or an RI, a process in which the UE performs preferential combination on the four CSI measurement results of the type of CSI process may be implemented by using the following process: The UE separately averages all CQI values that are based on same RI values and in the four CSI measurement results, to obtain a CQI average value corresponding to each RI, and then uses a CQI average value corresponding to the maximum RI as the CSI measurement result of the type of CSI process. Alternatively, the UE separately selects a maximum CQI value 4 from all CQI values in the four CSI measurement results, and then uses the maximum CQI value 4 as the CSI measurement result of the type of CSI process.

(3). The UE selects, from six CSI measurement results corresponding to six types of CSI processes, an optimal CSI process type corresponding to an optimal beam.

b5. The base station sends a reference signal to the UE according to reference signal configuration information corresponding to the optimal CSI process type corresponding to the optimal beam.

According to the resource configuration and channel quality measurement method provided in this embodiment of the present invention, a base station configures four CSI processes for UE in each subframe in a restrictive measurement subframe according to six different beams. After receiving the CSI processes configured by the base station, the UE performs corresponding CSI measurement and feedback. Then, the UE or the base station selects an optimal beam from the six beams according to a CSI measurement result of a vertical-direction beam in a column corresponding to each CSI process in 24 received CSI processes. Finally, the base station sends a reference signal to the UE according to reference signal configuration information corresponding to a CSI process of the optimal beam. Therefore, when the base station configures a best reference signal for the UE, the base station needs to configure only the selected optimal CSI process for the UE in each subframe in the restrictive measurement subframe set, so that overheads of corresponding measurement and feedback performed by the UE on the reference signal are reduced, and resources are saved.

Figure 9:
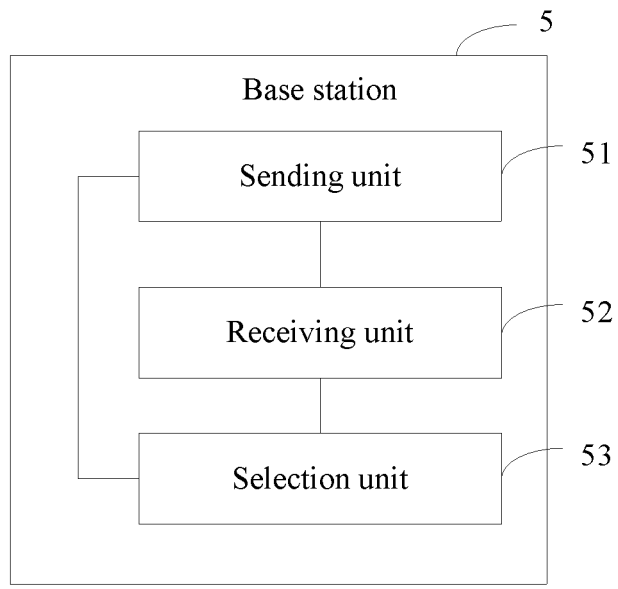
FIG. 9 is a schematic structural diagram of a base station according to an embodiment of the present invention.

An embodiment of the present invention provides a base station. As shown in FIG. 9, the base station 5 includes a sending unit 51, a receiving unit 52, and a selection unit 53.

The sending unit 51 is configured to send M reference signals to user equipment UE in N time units in a time unit set.

The reference signal is used by the UE to perform channel quality measurement. Each reference signal in the M reference signals is corresponding to one piece of precoding matrix information.

The receiving unit 52 is configured to receive channel quality indication information sent by the UE. The channel quality indication information is determined by the UE according to the M reference signals.

The selection unit 53 is configured to select an optimal reference signal resource for the UE according to the channel quality indication information.

The sending unit 51 is further configured to send an optimal reference signal to the UE according to the optimal reference signal resource.

Optionally, the sending unit 51 is further configured to send resource configuration information of the M reference signals to the UE in the N time units in the time unit set.

The resource configuration information of the reference signals includes at least one piece of port information of the reference signals, number information of the reference signals, or precoding information corresponding to the reference signals.

Optionally, the channel quality indication information includes M channel quality measurement results, an optimal channel quality measurement result, or a reference signal number.

Optionally, the time unit set is notified by the base station to the UE by using higher layer signaling or a control channel.

Optionally, the time unit set is periodically or non-periodically notified by the base station to the UE.

Optionally, the reference signal includes a cell-specific reference signal or a user-specific reference signal.

Optionally, when the reference signal is a cell-specific reference signal, the base station indicates the resource configuration information of the reference signals by using a broadcast channel.

Optionally, when sending the optimal reference signal to the UE according to the optimal reference signal resource, the sending unit 51 is specifically configured to send the optimal reference signal to the UE according to the optimal reference signal resource in each time unit that is after the time unit set and before a next time unit set is configured.

According to the base station provided in this embodiment of the present invention, the base station needs to send only M reference signals to UE in N time units in a configured time unit set. After receiving the M reference signals, the UE performs channel quality measurement M times based on the M different reference signals to obtain M channel quality measurement results, and sends channel quality indication information to the base station according to the M channel quality measurement results. The base station selects an optimal reference signal for the UE according to the channel quality indication information, and sends the optimal reference signal to the UE. Compared with the prior art in which to configure a best reference signal for UE, a base station needs to configure reference signals corresponding to all possible combinations for the UE, to enable the UE to separately perform channel quality measurement and feedback, in the solution provided in the present invention, the M different reference signals are configured for the UE in the N time units in the configured time unit set, so that configuration of unnecessary reference signals by the base station is reduced. Therefore, reference signals and overheads of corresponding measurement and feedback are reduced, and resources are saved.

Figure 10:
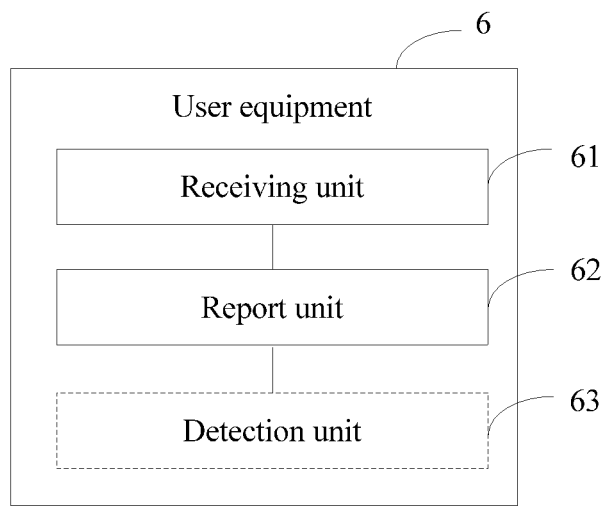
FIG. 10 is a schematic structural diagram of user equipment according to an embodiment of the present invention.

An embodiment of the present invention provides user equipment. As shown in FIG. 10, the user equipment 6 includes a receiving unit 61 and a report unit 62.

The receiving unit 61 is configured to receive M reference signals sent by a base station in N time units in a time unit set. Each reference signal in the M reference signals is corresponding to one piece of precoding matrix information.

The report unit 62 is configured to report channel quality indication information to the base station based on the M reference signals received by the receiving unit, so that the base station selects an optimal reference signal resource for the UE according to the channel quality indication information.

The receiving unit 61 is further configured to receive an optimal reference signal sent by the base station according to the optimal reference signal resource.

Optionally, the receiving unit 61 is further configured to receive resource configuration information of the M reference signals that is sent by the base station in the N time units in the time unit set.

The resource configuration information of the reference signals includes port information of the reference signals, number information of the reference signals, or precoding information corresponding to the reference signals.

Optionally, the channel quality indication information includes M channel quality measurement results, an optimal channel quality measurement result, or a reference signal number.

Optionally, the time unit set is notified by the base station to the UE by using higher layer signaling or a control channel.

Optionally, the reference signal includes a cell-specific reference signal or a user-specific reference signal.

Optionally, as shown in FIG. 10, when the reference signal is a cell-specific reference signal, the user equipment 6 further includes a detection unit 63.

The detection unit 63 is configured to detect a broadcast channel to obtain the resource configuration information of the reference signals.

Optionally, the time unit set is periodically or non-periodically notified by the base station to the UE.

Optionally, when receiving the optimal reference signal sent by the base station according to the optimal reference signal resource, the receiving unit 61 is specifically configured to: receive, in each time unit that is after the time unit set and before a next time unit set is configured, the optimal reference signal sent by the base station according to the optimal reference signal resource.

According to the user equipment provided in this embodiment of the present invention, UE receives M reference signals sent by a base station in N time units in a configured time unit set, performs channel quality measurement M times based on the M different reference signals to obtain M channel quality measurement results, and obtains channel quality indication information according to the M channel quality measurement results, so that the base station selects an optimal reference signal for the UE according to the channel quality indication information, and sends the optimal reference signal to the UE. Compared with the prior art in which to configure a best reference signal for UE, a base station needs to configure reference signals corresponding to all possible combinations for the UE, to enable the UE to separately perform channel quality measurement and feedback, in the solution provided in the present invention, the M different reference signals are configured for the UE in the N time units in the configured time unit set, and in a time unit outside the configured time unit set, the base station configures, for the UE, only the optimal reference signal selected from the M reference signals, so that configuration of unnecessary reference signals by the base station is reduced. Therefore, reference signals and overheads of corresponding measurement and feedback are reduced, and resources are saved.

Figure 11:
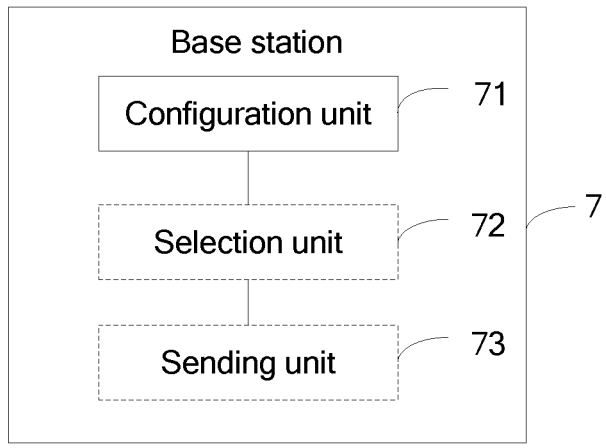
FIG. 11 is a schematic structural diagram of another base station according to an embodiment of the present invention.

An embodiment of the present invention provides a base station. As shown in FIG. 11, the base station 7 includes a configuration unit 71.

The configuration unit 71 is configured to configure M channel quality measurement processes for a user terminal UE in N time units in a time unit set. Each channel quality measurement process is corresponding to one piece of reference signal configuration information. The reference signal configuration information is used by the UE to perform channel quality measurement based on a configured reference signal. The M channel quality measurement processes include L types of channel quality measurement processes, each type of channel quality measurement process includes a maximum of N channel quality measurement processes, and $L \leq M \leq L*N$.

Optionally, each channel quality measurement process in the L types of channel quality measurement processes is corresponding to one piece of precoding matrix information, and precoding matrix information corresponding to any two types of channel quality measurement processes is different.

Optionally, each type of channel quality measurement process in the L types of channel quality measurement processes is corresponding to one channel quality measurement result. The channel quality measurement result corresponding to each type of channel quality measurement process is obtained by the UE or the base station based on channel quality measurement results in all channel quality measurement processes that belong to the type and that are in the M channel quality measurement processes.

Optionally, as shown in FIG. 11, the base station 7 further includes a selection unit 72 and a sending unit 73.

The selection unit 72 is configured to select an optimal type of channel quality measurement process according to channel quality measurement results corresponding to the L types of channel quality measurement processes.

The sending unit 73 is configured to send a reference signal to the UE according to reference signal configuration information corresponding to the type of channel quality measurement process.

Optionally, the channel quality measurement result includes at least one of a channel quality indicator CQI, a precoding matrix indicator PMI, a rank indicator RI, reference signal received power RSRP, reference signal received quality RSRQ, or a reference signal strength indicator RSSI.

Optionally, each channel quality measurement process in the M channel quality measurement processes includes an identification field. The identification field includes channel quality measurement process identification information that is used to indicate a type to which the channel quality measurement process belongs. Identification information in channel quality measurement processes of a same type is the same.

Optionally, the M channel quality measurement processes are notified by the base station to the UE by using higher layer signaling or a control channel.

Optionally, the M channel quality measurement processes are periodically or non-periodically notified by the base station to the UE.

According to the base station provided in this embodiment of the present invention, the base station configures M channel quality measurement processes for UE in N time units in a configured time unit set. Each channel quality measurement process in the M channel quality measurement processes is corresponding to one piece of reference signal configuration information, the M channel quality measurement processes include L types of channel quality measurement processes, and each type of channel quality measurement process includes a maximum of N channel quality measurement processes. Therefore, based on configuration of the L types of channel quality measurement processes and corresponding channel quality measurement, the base station may select an optimal type of channel quality measurement process for the UE, and further select an optimal reference signal configuration. When configuring a best reference signal for the UE, the base station needs to configure only the optimal channel quality measurement process for the UE in each time unit outside the time unit set, so that the base station reduces reference signals, channel quality measurement processes, and overheads of corresponding measurement and feedback, and resources are saved.

Figure 12:
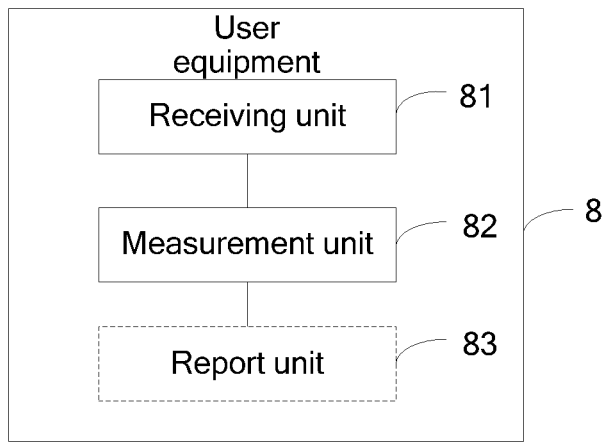
FIG. 12 is a schematic structural diagram of another user equipment according to an embodiment of the present invention.

An embodiment of the present invention provides user equipment 8. As shown in FIG. 12, the user equipment 8 includes a receiving unit 81 and a report unit 82.

The receiving unit 81 is configured to receive, in N time units in a time unit set, M channel quality measurement processes configured by a base station. Each channel quality measurement process is corresponding to one piece of reference signal configuration information. The M channel quality measurement processes include L types of channel quality measurement processes, each type of channel quality measurement process includes a maximum of N channel quality measurement processes, and L<=M<=L*N.

The report unit 82 is configured to perform channel quality measurement based on the M configured channel quality measurement processes received by the receiving unit 81 and a reference signal corresponding to each channel quality measurement process.

Optionally, each channel quality measurement process in the L types of channel quality measurement processes is corresponding to one piece of precoding matrix information, and precoding matrix information corresponding to any two types of channel quality measurement processes is different.

Optionally, each type of channel quality measurement process in the L types of channel quality measurement processes is corresponding to one channel quality measurement result. The channel quality measurement result corresponding to each type of channel quality measurement process is obtained by the UE or the base station based on channel quality measurement results in all channel quality measurement processes that belong to the type and that are in the M channel quality measurement processes.

Optionally, as shown in FIG. 12, the user equipment 8 further includes a report unit 83.

The report unit 83 is configured to report channel quality measurement results corresponding to the L types of channel quality measurement processes to the base station, so that the base station selects an optimal type of channel quality measurement process according to the channel quality measurement results corresponding to the L types of channel quality measurement processes.

The receiving unit 81 is further configured to receive a reference signal sent by the base station according to reference signal configuration information corresponding to the selected optimal type of channel quality measurement process.

Optionally, the channel quality measurement result includes at least one of a channel quality indicator CQI, a precoding matrix indicator PMI, a rank indicator RI, reference signal received power RSRP, reference signal received quality RSRQ, or a reference signal strength indicator RSSI.

Optionally, each channel quality measurement process in the M channel quality measurement processes includes an identification field. The identification field includes channel quality measurement process identification information that is used to indicate a type to which the channel quality measurement process belongs. Identification information in channel quality measurement processes of a same type is the same.

Optionally, the M channel quality measurement processes are notified by the base station to the UE by using higher layer signaling or a control channel.

Optionally, the M channel quality measurement processes are periodically or non-periodically notified by the base station to the UE.

According to the user equipment provided in this embodiment of the present invention, the UE receives, in N time units in a configured time unit set, M channel quality measurement processes configured by a base station, and performs channel quality measurement based on the M configured channel quality measurement processes and a reference signal corresponding to each channel quality measurement process. Each channel quality measurement process in the M channel quality measurement processes is corresponding to one piece of reference signal configuration information, the M channel quality measurement processes include L types of channel quality measurement processes, and each type of channel quality measurement process includes a maximum of N channel quality measurement processes. Therefore, based on channel quality measurement on the L types of channel quality measurement processes, the UE may separately report a channel quality measurement result corresponding to each type of channel quality measurement process, so that the base station may select an optimal type of channel quality measurement process for the UE, and further select an optimal reference signal configuration. Therefore, when the base station configures a best reference signal for the UE, the base station may configure the optimal type of channel quality measurement process for the UE in each time unit outside the time unit set, so that overheads of corresponding measurement and feedback performed by the UE on the reference signal are reduced, and resources are saved.

Figure 13:
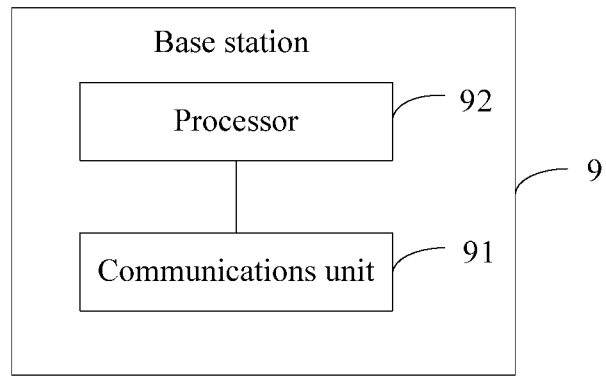
FIG. 13 is a schematic structural diagram of still another base station according to an embodiment of the present invention.

An embodiment of the present invention provides a base station 9. As shown in FIG. 13, the base station 9 includes a communications unit 91 and a processor 92.

The communications unit 91 is configured to communicate with an external device.

The processor 92 is configured to:

send M reference signals to user equipment UE in N time units in a time unit set, where the reference signal is used by the UE to perform channel quality measurement, and each reference signal in the M reference signals is corresponding to one piece of precoding matrix information;

receive, by using the communications unit 91, channel quality indication information sent by the UE, where the channel quality indication information is determined by the UE according to the M reference signals;

select an optimal reference signal resource for the UE according to the channel quality indication information; and send an optimal reference signal to the UE according to the optimal reference signal resource by using the communications unit 91.

Optionally, the processor 92 is further configured to send resource configuration information of the M reference signals to the UE in the N time units in the time unit set by using the communications unit 91. The resource configuration information of the reference signals includes at least one piece of port information of the reference signals, number information of the reference signals, or precoding information corresponding to the reference signals.

Optionally, the channel quality indication information includes M channel quality measurement results, an optimal channel quality measurement result, or a reference signal number.

Optionally, the time unit set is notified by the base station to the UE by using higher layer signaling or a control channel.

Optionally, the time unit set is periodically or non-periodically notified by the base station to the UE.

Optionally, the reference signal includes a cell-specific reference signal or a user-specific reference signal.

Optionally, when the reference signal is a cell-specific reference signal, the base station indicates the resource configuration information of the reference signals by using a broadcast channel.

Optionally, when sending the optimal reference signal to the UE according to the optimal reference signal resource by using the communications unit 91, the processor 92 is specifically configured to:

send, by using the communications unit 91, the optimal reference signal to the UE according to the optimal reference signal resource in each time unit that is after the time unit set and before a next time unit set is configured.

According to the base station provided in this embodiment of the present invention, the base station needs to send only M reference signals to UE in N time units in a configured time unit set. After receiving the M reference signals, the UE performs channel quality measurement M times based on the M different reference signals to obtain M channel quality measurement results, and sends channel quality indication information to the base station according to the M channel quality measurement results. The base station selects an optimal reference signal for the UE according to the channel quality indication information, and sends the optimal reference signal to the UE. Compared with the prior art in which to configure a best reference signal for UE, a base station needs to configure reference signals corresponding to all possible combinations for the UE, to enable the UE to separately perform channel quality measurement and feedback, in the solution provided in the present invention, the M different reference signals are configured for the UE in the N time units in the configured time unit set, so that configuration of unnecessary reference signals by the base station is reduced. Therefore, reference signals and overheads of corresponding measurement and feedback are reduced, and resources are saved.

Figure 14:
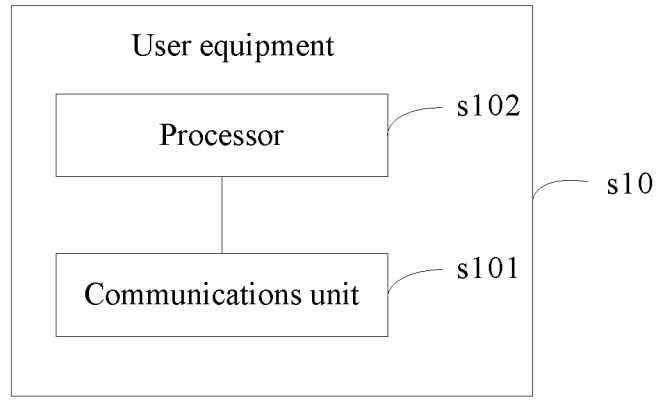
FIG. 14 is a schematic structural diagram of still another user equipment according to an embodiment of the present invention.

An embodiment of the present invention provides user equipment s10. As shown in FIG. 14, the user equipment s10 includes a communications unit s101 and a processor s102.

The communications unit s101 is configured to communicate with an external device.

The processor s102 is configured to:

receive, by using the communications unit s101, M reference signals sent by a base station in N time units in a time unit set, where each reference signal in the M reference signals is corresponding to one piece of precoding matrix information;

report channel quality indication information to the base station based on the M reference signals, so that the base station selects an optimal reference signal resource for the UE according to the channel quality indication information; and receive, by using the communications unit s101, an optimal reference signal sent by the base station according to the optimal reference signal resource.

Optionally, the processor s102 is further configured to receive, by using the communications unit s101, resource configuration information of the M reference signals that is sent by the base station in the N time units in the time unit set.

The resource configuration information of the reference signals includes at least one piece of port information of the reference signals, number information of the reference signals, or precoding information corresponding to the reference signals.

Optionally, the channel quality indication information includes M channel quality measurement results, an optimal channel quality measurement result, or a reference signal number.

Optionally, the time unit set is notified by the base station to the UE by using higher layer signaling or a control channel.

Optionally, the time unit set is periodically or non-periodically notified by the base station to the UE.

Optionally, the reference signal includes a cell-specific reference signal or a user-specific reference signal.

Optionally, when the reference signal is a cell-specific reference signal, the processor s102 is further configured to detect a broadcast channel to obtain the resource configuration information of the reference signals.

Optionally, when receiving, by using the communications unit s101, the optimal reference signal sent by the base station according to the optimal reference signal resource, the processor s102 is specifically configured to:

in each time unit that is after the time unit set and before a next time unit set is configured, receive, by using the communications unit s101, the optimal reference signal sent by the base station according to the optimal reference signal resource.

According to the user equipment provided in this embodiment of the present invention, UE receives M reference signals sent by a base station in N time units in a configured time unit set, performs channel quality measurement M times based on the M different reference signals to obtain M channel quality measurement results, and obtains channel quality indication information according to the M channel quality measurement results, so that the base station selects an optimal reference signal for the UE according to the channel quality indication information, and sends the optimal reference signal to the UE. Compared with the prior art in which to configure a best reference signal for UE, a base station needs to configure reference signals corresponding to all possible combinations for the UE, to enable the UE to separately perform channel quality measurement and feedback, in the solution provided in the present invention, the M different reference signals are configured for the UE in the N time units in the configured time unit set, and in a time unit outside the configured time unit set, the base station configures, for the UE, only the optimal reference signal selected from the M reference signals, so that configuration of unnecessary reference signals by the base station is reduced. Therefore, reference signals and overheads of corresponding measurement and feedback are reduced, and resources are saved.

Figure 15:
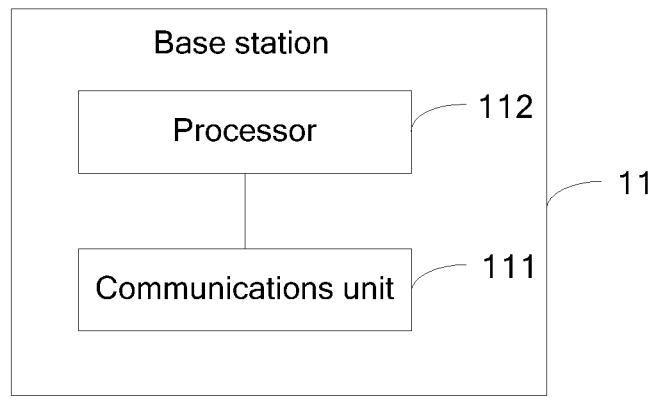
FIG. 15 is a schematic structural diagram of yet another base station according to an embodiment of the present invention.

An embodiment of the present invention provides a base station 11. As shown in FIG. 15, the base station 11 includes a communications unit 111 and a processor 112.

The communications unit 111 is configured to communicate with an external device.

The processor 112 is configured to:

configure, by using the communications unit 111, M channel quality measurement processes for a user terminal UE in N time units in a time unit set, where each channel quality measurement process is corresponding to one piece of reference signal configuration information, the reference signal configuration information is used by the UE to perform channel quality measurement based on a configured reference signal, the M channel quality measurement processes include L types of channel quality measurement processes, each type of channel quality measurement process includes a maximum of N channel quality measurement processes, and $L<=M<=L*N$.

Optionally, each channel quality measurement process in the L types of channel quality measurement processes is corresponding to one piece of precoding matrix information, and precoding matrix information corresponding to any two types of channel quality measurement processes is different.

Optionally, each type of channel quality measurement process in the L types of channel quality measurement processes is corresponding to one channel quality measurement result. The channel quality measurement result corresponding to each type of channel quality measurement process is obtained by the UE or the base station based on channel quality measurement results in all channel quality measurement processes that belong to the type and that are in the M channel quality measurement processes.

Optionally, the processor 112 is further configured to: select an optimal type of channel quality measurement process according to channel quality measurement results corresponding to the L types of channel quality measurement processes; and send, by using the communications unit 111, a reference signal to the UE according to reference signal configuration information corresponding to the type of channel quality measurement process.

Optionally, the channel quality measurement result includes at least one of a channel quality indicator CQI, a precoding matrix indicator PMI, a rank indicator RI, reference signal received power RSRP, reference signal received quality RSRQ, or a reference signal strength indicator RSSI.

Optionally, each channel quality measurement process in the M channel quality measurement processes includes an identification field. The identification field includes channel quality measurement process identification information that is used to indicate a type to which the channel quality measurement process belongs. Identification information in channel quality measurement processes of a same type is the same.

Optionally, the M channel quality measurement processes are notified by the base station to the UE by using higher layer signaling or a control channel.

Optionally, the M channel quality measurement processes are periodically or non-periodically notified by the base station to the UE.

According to the base station provided in this embodiment of the present invention, the base station configures M channel quality measurement processes for UE in N time units in a configured time unit set. Each channel quality measurement process in the M channel quality measurement processes is corresponding to one piece of reference signal configuration information, the M channel quality measurement processes include L types of channel quality measurement processes, and each type of channel quality measurement process includes a maximum of N channel quality measurement processes. Therefore, based on configuration of the L types of channel quality measurement processes and corresponding channel quality measurement, the base station may select an optimal type of channel quality measurement process for the UE, and further select an optimal reference signal configuration. When configuring a best reference signal for the UE, the base station needs to configure only the optimal channel quality measurement process for the UE in each time unit outside the time unit set, so that the base station reduces reference signals, channel quality measurement processes, and overheads of corresponding measurement and feedback, and resources are saved.

Figure 16:
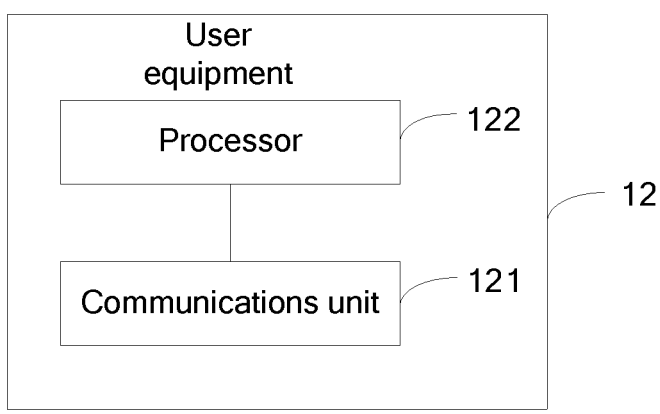
FIG. 16 is a schematic structural diagram of yet another user equipment according to an embodiment of the present invention.

An embodiment of the present invention provides user equipment 12. As shown in FIG. 16, the user equipment 12 includes a communications unit 121 and a processor 122.

The communications unit 121 is configured to communicate with an external device.

The processor 122 is configured to:

receive, in N time units in a time unit set by using the communications unit 121, M channel quality measurement processes configured by a base station, where each channel quality measurement process is corresponding to one piece of reference signal configuration information, the M channel quality measurement processes include L types of channel quality measurement processes, each type of channel quality measurement process includes a maximum of N channel quality measurement processes, and $L<=M<=L*N$; and perform channel quality measurement based on the M configured channel quality measurement processes and a reference signal corresponding to each channel quality measurement process.

Optionally, each channel quality measurement process in the L types of channel quality measurement processes is corresponding to one piece of precoding matrix information, and precoding matrix information corresponding to any two types of channel quality measurement processes is different.

Optionally, each type of channel quality measurement process in the L types of channel quality measurement processes is corresponding to one channel quality measurement result. The channel quality measurement result corresponding to each type of channel quality measurement process is obtained by the UE or the base station based on channel quality measurement results in all channel quality measurement processes that belong to the type and that are in the M channel quality measurement processes.

Optionally, the processor 122 is further configured to: report, by using the communications unit 121, channel quality measurement results corresponding to the L types of channel quality measurement processes to the base station, so that the base station selects an optimal type of channel quality measurement process according to the channel quality measurement results corresponding to the L types of channel quality measurement processes; and receive, by using the communications unit 121, a reference signal sent by the base station according to reference signal configuration information corresponding to the selected optimal type of channel quality measurement process.

Optionally, the channel quality measurement result includes at least one of a channel quality indicator CQI, a precoding matrix indicator PMI, a rank indicator RI, reference signal received power RSRP, reference signal received quality RSRQ, or a reference signal strength indicator RSSI.

Optionally, each channel quality measurement process in the M channel quality measurement processes includes an identification field. The identification field includes channel quality measurement process identification information that is used to indicate a type to which the channel quality measurement process belongs. Identification information in channel quality measurement processes of a same type is the same.

Optionally, the M channel quality measurement processes are notified by the base station to the UE by using higher layer signaling or a control channel.

Optionally, the M channel quality measurement processes are periodically or non-periodically notified by the base station to the UE.

According to the user equipment provided in this embodiment of the present invention, the UE receives, in N time units in a configured time unit set, M channel quality measurement processes configured by a base station, and performs channel quality measurement based on the M configured channel quality measurement processes and a reference signal corresponding to each channel quality measurement process. Each channel quality measurement process in the M channel quality measurement processes is corresponding to one piece of reference signal configuration information, the M channel quality measurement processes include L types of channel quality measurement processes, and each type of channel quality measurement process includes a maximum of N channel quality measurement processes. Therefore, based on channel quality measurement on the L types of channel quality measurement processes, the UE may separately report a channel quality measurement result corresponding to each type of channel quality measurement process, so that the base station may select an optimal type of channel quality measurement process for the UE, and further select an optimal reference signal configuration. Therefore, when the base station configures a best reference signal for the UE, the base station may configure the optimal type of channel quality measurement process for the UE in each time unit outside the time unit set, so that overheads of corresponding measurement and feedback performed by the UE on the reference signal are reduced, and resources are saved.

It may be clearly understood by persons skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system and unit, refer to a corresponding process in the foregoing method embodiments, and details are not described herein again.

In the several embodiments provided in this application, it should be understood that the disclosed system and method may be implemented in other manners. For example, the described system embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the units may be implemented in electronic, mechanical, or other forms.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A resource configuration method, comprising:
configuring, by a base station, M channel quality measurement processes for a user equipment (UE) in N time units in a time unit set, wherein each channel quality measurement process corresponds to one piece of reference signal configuration information, the reference signal configuration information for enabling the UE to perform channel quality measurement based on a configured reference signal, the M channel quality measurement processes comprise L types of channel quality measurement processes, each type of channel quality measurement process comprises a maximum of N channel quality measurement processes, and $L<=M<=L*N$;
selecting, by the base station, an optimal type of channel quality measurement process from a channel quality measurement result corresponding to each type of channel quality measurement process of the L types of channel quality measurement processes; and
sending, by the base station, a reference signal to the UE according to reference signal configuration information corresponding to the optimal type of channel quality measurement process.

2. The method according to claim 1, wherein each type of channel quality measurement process in the L types of channel quality measurement processes corresponds to one channel quality measurement result, and the channel quality measurement result corresponding to each type of channel quality measurement process is obtained by the UE or the base station based on channel quality measurement results in all channel quality measurement processes that belong to the type and that are in the M channel quality measurement processes.

3. The method according to claim 2, wherein the channel quality measurement result comprises at least one of a channel quality indicator (CQI), a precoding matrix indicator (PMI), a rank indicator (RI), reference signal received power (RSRP), reference signal received quality (RSRQ), or a reference signal strength indicator (RSSI).

4. The method according to claim 1, wherein each channel quality measurement process in the M channel quality measurement processes comprises an identification field, the identification field comprises channel quality measurement process identification information that is used to indicate a type to which the channel quality measurement process belongs, and identification information in channel quality measurement processes of a same type is the same.

5. The method according to claim 1, wherein the base station notifies the UE of the M channel quality measurement processes by using higher layer signaling or a control channel, and the base station notifies the UE of the time unit set by using the higher layer signaling or the control channel.

6. A channel quality measurement method, comprising:
receiving, by user equipment (UE) in N time units in a time unit set, M channel quality measurement processes configured by a base station, wherein each channel quality measurement process corresponds to one piece of reference signal configuration information, the M channel quality measurement processes comprise L types of channel quality measurement processes, each type of channel quality measurement process comprises a maximum of N channel quality measurement processes, and $L<=M<=L*N$;
performing, by the UE, channel quality measurement based on the M configured channel quality measurement processes and a reference signal corresponding to each channel quality measurement process;
sending, by the UE, a channel quality measurement result corresponding to each type of channel quality measurement process to the base station for enabling the base station to select an optimal type of channel quality measurement process for the UE; and
receiving, by the UE, a reference signal from the base station according to reference signal configuration information corresponding to the optimal type of channel quality measurement process.

7. The method according to claim 6, wherein each type of channel quality measurement process in the L types of channel quality measurement processes corresponds to one channel quality measurement result, and the channel quality measurement result corresponding to each type of channel quality measurement process is obtained by the UE or the base station based on channel quality measurement results in all channel quality measurement processes that belong to the type and that are in the M channel quality measurement processes.

8. The method according to claim 7, wherein the channel quality measurement result comprises at least one of a channel quality indicator (CQI), a precoding matrix indicator (PMI), a rank indicator (RI), reference signal received power (RSRP), reference signal received quality (RSRQ), or a reference signal strength indicator (RSSI).

9. The method according to claim 6, wherein each channel quality measurement process in the M channel quality measurement processes comprises an identification field, the identification field comprises channel quality measurement process identification information that is used to indicate a type to which the channel quality measurement process belongs, and identification information in channel quality measurement processes of a same type is the same.

10. The method according to claim 6, wherein the base station notifies the UE of the time unit set by using higher layer signaling or a control channel.

11. A base station, comprising:
a processor, configured to:
configure M channel quality measurement processes for a user terminal (UE) in N time units in a time unit set, wherein each channel quality measurement process corresponds to one piece of reference signal configuration information, the reference signal configuration information for enabling the UE to perform channel quality measurement based on a configured reference signal, the M channel quality measurement processes comprise L types of channel quality measurement processes, each type of channel quality measurement process comprises a maximum of N channel quality measurement processes, and L<=M<=L*N, and
select an optimal type of channel quality measurement process from a channel quality measurement result corresponding to each type of channel quality measurement process of the L types of channel quality measurement processes; and
a transmitter configured to send a reference signal to the UE according to reference signal configuration information corresponding to the optimal type of channel quality measurement process.

12. The base station according to claim 11, wherein each type of channel quality measurement process in the L types of channel quality measurement processes corresponds to one channel quality measurement result, and the channel quality measurement result corresponding to each type of channel quality measurement process is obtained by the UE or the base station based on channel quality measurement results in all channel quality measurement processes that belong to the type and that are in the M channel quality measurement processes.

13. The base station according to claim 12, wherein the channel quality measurement result comprises at least one of a channel quality indicator (CQI), a precoding matrix indicator (PMI), a rank indicator (RI), reference signal received power (RSRP), reference signal received quality (RSRQ), or a reference signal strength indicator (RSSI).

14. The base station according to claim 11, wherein each channel quality measurement process in the M channel quality measurement processes comprises an identification field, the identification field comprises channel quality measurement process identification information that is used to indicate a type to which the channel quality measurement process belongs, and identification information in channel quality measurement processes of a same type is the same.

15. The base station according to claim 11, wherein the base station notifies the UE of the time unit set by using higher layer signaling or a control channel.

16. User equipment, comprising:
a receiver, configured to:
receive, in N time units in a time unit set, M channel quality measurement processes configured by a base station, wherein each channel quality measurement process corresponds to one piece of reference signal configuration information, the M channel quality measurement processes comprise L types of channel quality measurement processes, each type of channel quality measurement process comprises a maximum of N channel quality measurement processes, and L<=M<=L*N, and
receive a reference signal from the base station according to reference signal configuration information corresponding to and optimal type of channel quality measurement process;
a processor, configured to perform channel quality measurement based on the M configured channel quality measurement processes received by the receiver and a reference signal corresponding to each channel quality measurement process; and
a transmitter configured to send a channel quality measurement result corresponding to each type of channel quality measurement process to the base station for enabling the base station to select the optimal type of channel quality measurement process for the UE.

17. The user equipment according to claim 16, wherein each type of channel quality measurement process in the L types of channel quality measurement processes corresponds to one channel quality measurement result, and the channel quality measurement result corresponding to each type of channel quality measurement process is obtained by the UE or the base station based on channel quality measurement results in all channel quality measurement processes that belong to the type and that are in the M channel quality measurement processes.

18. The user equipment according to claim 17, wherein the channel quality measurement result comprises at least one of a channel quality indicator (CQI), a precoding matrix indicator (PMI), a rank indicator (RI), reference signal received power (RSRP), reference signal received quality (RSRQ), or a reference signal strength indicator (RSSI).

19. The user equipment according to claim 16, wherein each channel quality measurement process in the M channel quality measurement processes comprises an identification field, the identification field comprises channel quality measurement process identification information that is used to indicate a type to which the channel quality measurement process belongs, and identification information in channel quality measurement processes of a same type is the same.

20. The user equipment according to claim 16, wherein the base station notifies the UE of the time unit set by using higher layer signaling or a control channel.

* * * * *